United States Patent
Negoro

(10) Patent No.: US 6,232,021 B1
(45) Date of Patent: May 15, 2001

(54) NONAQUEOUS SECONDARY BATTERY

(75) Inventor: Masayuki Negoro, Kanagawa (JP)

(73) Assignee: Fuji Photo Film Co., Ltd., Kanagawa (JP)

( * ) Notice: Subject to any disclaimer, the term of this patent is extended or adjusted under 35 U.S.C. 154(b) by 0 days.

(21) Appl. No.: 09/236,333

(22) Filed: Jan. 25, 1999

(30) Foreign Application Priority Data

Feb. 3, 1998 (JP) .................................................. 10-022381

(51) Int. Cl.[7] ...................................................... H01M 6/16

(52) U.S. Cl. ........................... 429/328; 429/307; 429/332; 429/336; 429/339; 429/231.1

(58) Field of Search ..................................... 429/328, 339, 429/307, 332, 336, 231.1

(56) References Cited

U.S. PATENT DOCUMENTS 5,849,432 * 12/1998 Angell et al. ........................ 429/190
5,976,731 * 11/1999 Negoro et al. ....................... 429/328

FOREIGN PATENT DOCUMENTS 6-333598 * 12/1994 (JP) .
10-134845 * 5/1998 (JP) .
11-3728 * 1/1999 (JP) .

* cited by examiner

Primary Examiner—Laura Weiner
(74) Attorney, Agent, or Firm—Sughrue, Mion, Zinn Macpeak & Seas, PLLC

(57) ABSTRACT

A nonaqueous secondary battery comprising a positive electrode material, a negative electrode material, and a nonaqueous electrolytic solution containing a lithium salt, which contains at least one triarylamine compound and at least one organoboron compound. The battery has a high capacity and satisfactory charge and discharge cycle characteristics.

7 Claims, 1 Drawing Sheet

NONAQUEOUS SECONDARY BATTERY

FIELD OF THE INVENTION

This invention relates to a high-capacity nonaqueous secondary battery excellent in charge and discharge cycle characteristics. More particularly, it relates to an improvement on charge and discharge characteristics, such as a cycle life, of a high-capacity nonaqueous secondary battery comprising a predominantly amorphous chalcogenide or a predominantly amorphous oxide as a negative electrode material.

BACKGROUND OF THE INVENTION

Negative electrode materials for nonaqueous secondary batteries typically include metallic lithium and lithium alloys. The problem associated with these lithium materials is that metallic lithium grows dendritically during charge and discharge to cause an internal short circuit, involving a danger of ignition because of high activity of the dendrite per se. To solve the problem, a fired carbonaceous material capable of reversibly intercalating and deintercalating lithium has been put to practical use. However, the carbonaceous material is disadvantageous in that the capacity per unit volume is low due to a relatively small packing density and that it tends to cause metallic lithium to precipitate thereon in case of overcharge or rapid charge because of its own electrical conductivity.

Other negative electrode materials that have been capable of providing a high-capacity nonaqueous secondary battery having an average discharge voltage as high as 3 to 3.6 V include oxides and composite oxides of Sn, V, Si, B, Zr, etc. (see JP-A-5-174818, JP-A-6-60867, JP-A-6-275267, JP-A-6-325765, JP-A-6-338324, and EP-615296; the term "JP-A" as used herein means an "unexamined published Japanese patent application"). Combined with a positive electrode comprising a certain lithium-containing transition metal compound, these oxides or composite oxides afford a nonaqueous secondary battery having high capacity (an average discharge voltage of 3 to 3.6 V) and high safety, scarcely involving dendrite formation under practical conditions. Further improvement in charge and discharge cycle characteristics has still been demanded, though.

Altering the composition of an electrolytic solution has been attempted as another approach to improvement in charge and discharge cycle characteristics. For example, JP-A-6-333598 teaches addition of a trialkylamine or a triarylamine to an electrolytic solution. This and other proposals, however, are still insufficient for obtaining both high discharge capacity and excellent cycle characteristics where metallic lithium, a lithium alloy or a carbonaceous material is used as a negative electrode material.

Some proposals are found on addition of specific organoboron compounds, which still fail to achieve a satisfactory level of improvement.

SUMMARY OF THE INVENTION

An object of the present invention is to provide a nonaqueous secondary battery having a high discharge capacity and excellent charge and discharge cycle characteristics.

The object of the invention is accomplished by a nonaqueous secondary battery comprising a positive electrode and a negative electrode both containing a material capable of reversibly intercalating and deintercalating lithium, a nonaqueous electrolytic solution (i.e., a nonaqueous liquid electrolyte) containing a lithium salt, and a separator, wherein the battery contains at least one triarylamine compound and at least one organoboron compound.

The present invention provides a nonaqueous secondary battery which has excellent charge and discharge characteristics and a satisfactory discharge capacity retention over its service life.

Figure 1:
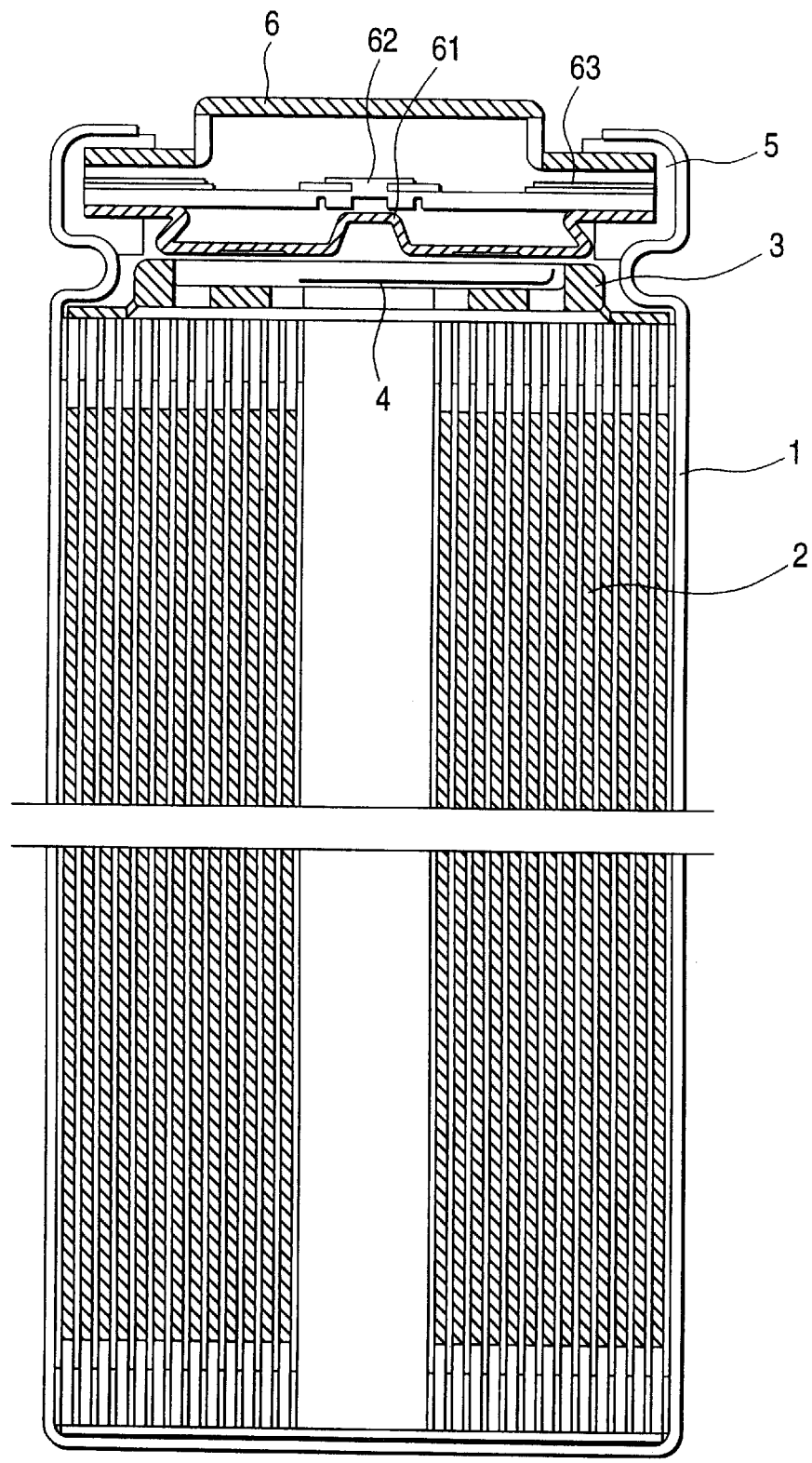
FIG. 1 is a cross-sectional view of a cylindrical battery prepared in Examples.

Explanation of Reference Numeral:
1. Battery case serving as negative electrode
2. Electrode group (rolled up)
3. Upper insulating plate
4. Positive electrode lead
5. Gasket
6. Battery lid serving as positive electrode terminal
61. Pressure-sensitive valve
62. Current breaking element (switch)
63. PTC ring (element)

DETAILED DESCRIPTION OF THE INVENTION

The triarylamine compound which can be used in the present invention is represented by formula: $N(Ar_1)(Ar_2)(Ar_3)$, wherein $Ar_1$, $Ar_2$, and $Ar_3$, which may be the same or different, each represent an aryl group.

The term "aryl group" as used herein means a cyclic substituent satisfying the Huckel's law of $(4n+2)\pi$ electrons. Examples of such aryl groups include aromatic hydrocarbon groups (e.g., phenyl, naphthyl and anthranyl) and aromatic heterocyclic groups (e.g., furyl, thienyl, pyridyl and indolyl). $Ar_1$, $Ar_2$, and $Ar_3$ may be connected together to form a ring. Preferred triarylamine compounds are triphenylamine derivatives, carbazole derivatives, phenothiazine derivatives, and phenoxazine derivatives.

Unless otherwise noted, all the groups referred to herein may have a substituent or substituents if possible. Examples of such substituents include a substituted or unsubstituted alkyl group (e.g., methyl, ethyl, n-propyl, isopropyl, n-butyl, pentyl, hexyl, heptyl, octyl, nonyl, 2-chloroethyl, 3-methoxyethyl, methoxyethoxyethyl, 2-hydroxy-ethyl, 3-hydroxypropyl or trifluoromethyl), a cycloalkyl group, an alkoxy group (e.g., methoxy, ethoxy, n-propoxy or n-butoxy), an alkenyl group, an alkynyl group, an aralkyl group, an aryl group, a halogen atom, a cyano group, a nitro group, a hydroxyl group, a formyl group, an aryloxy group, an alkylthio group, an arylthio group, an acyloxy group, a sulfonyloxy group, an amino group, an alkylamino group, an arylamino group, a carbonamido group, a sulfonamido group, an oxycarbonylamino group, an oxysulfonylamino group, a ureido group, an acyl group, an oxycarbonyl group, a carbamoyl group, a sulfonyl group, a sulfinyl group, an oxysulfinyl group, a sulfamoyl group, a carboxylic acid group or a salt thereof, a sulfonic acid group or a salt thereof, a phosphoric acid group or a salt thereof, and a heterocyclic group.

$Ar_1$, $Ar_2$, and $Ar_3$ each preferably have 6 to 46 carbon atoms, particularly 6 to 30 carbon atoms, in total. Examples of preferred substituents on these aryl groups include an alkoxy group, an alkylthio group, a carbonamido group, an aryl group, an alkyl group, a halogen atom, an oxycarbonyl group, a formyl group, an acyl group, a sulfamoyl group, a cyano group, and a nitro group.

The triarylamine compound used in the present invention preferably includes those represented by formula (I) or (II):

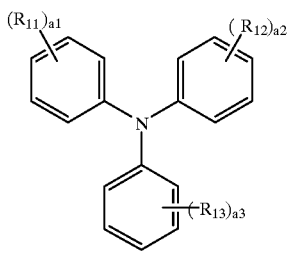

(I)

wherein $R_{11}$, $R_{12}$, and $R_{13}$, which may be the same or different, each represent a hydrogen atom, an alkyl group, a cycloalkyl group, an alkoxy group, an alkenyl group, an alkynyl group, an aralkyl group, an aryl group, a halogen atom, a cyano group, a nitro group, a hydroxyl group, a formyl group, an aryloxy group, an alkylthio group, an arylthio group, an acyloxy group, a sulfonyloxy group, an amino group, an alkylamino group, an arylamino group, a carbonamido group, a sulfonamido group, an oxycarbonylamino group, an oxysulfonylamino group, a ureido group, an acyl group, an oxycarbonyl group, a carbamoyl group, a sulfonyl group, a sulfinyl group, an oxysulfinyl group, a sulfamoyl group, a carboxylic acid group or a salt thereof, a sulfonic acid group or a salt thereof, a phosphoric acid group or a salt thereof, or a heterocyclic group; and a1, a2, and a3 each represent 0 or an integer of 1 to 5.

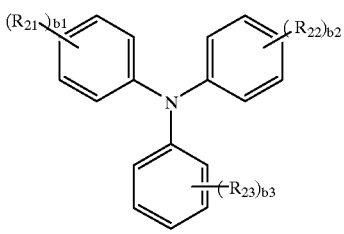

(II)

wherein $R_{21}$, $R_{22}$, and $R_{23}$ have the same meaning as $R_{11}$, $R_{12}$ and $R_{13}$ in formula (I); b1 and b2 each represent 0 or an integer of 1 to 4; and b3 represents 0 or an integer of 1 to 5.

In formula (I), examples of the alkyl group as represented by $R_{11}$, $R_{12}$ or $R_{13}$ includes methyl, ethyl, n-propyl, isopropyl, n-butyl, pentyl, hexyl, heptyl, octyl, nonyl, 2-chloroethyl, 3-methoxyethyl, methoxyethoxyethyl, 2-hydroxy-ethyl, 3-hydroxypropyl, and trifluoromethyl groups, and examples of the alkoxy group as represented by $R_{11}$, $R_{12}$ or $R_{13}$ includes methoxy, ethoxy, n-propoxy, and n-butoxy groups.

Of the above-enumerated substituents $R_{11}$, $R_{12}$ or $R_{13}$, preferred are a hydrogen atom, an alkyl group, an aryl group, an alkoxy group, an alkylthio group, a carbonamido group, a halogen atom, an oxycarbonyl group, a formyl group, an acyl group, a sulfamoyl group, a cyano group, and a nitro group. Particularly preferred are a hydrogen atom, an alkyl group, a halogen atom, and a cyano group.

Specific but non-limiting examples of the triarylamine compounds represented by formula (I) are shown below.

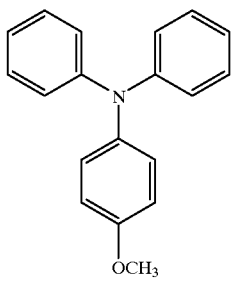

A-1

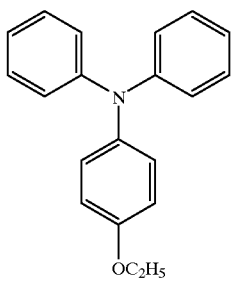

A-2

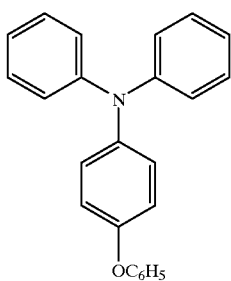

A-3

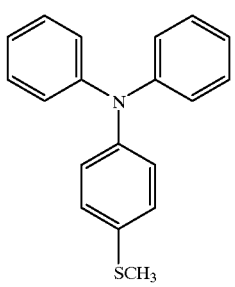

A-4

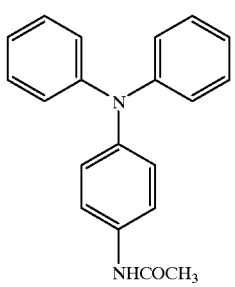

A-5

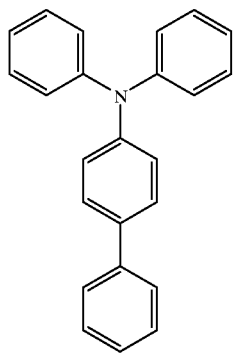
A-6
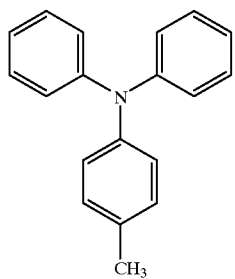
A-7
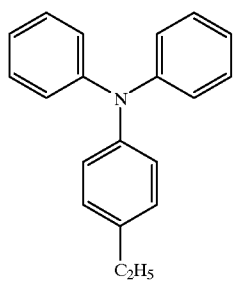
A-8
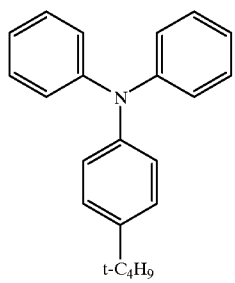
A-9
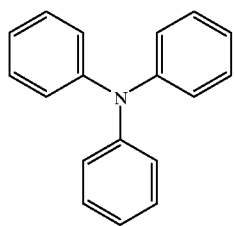
A-10
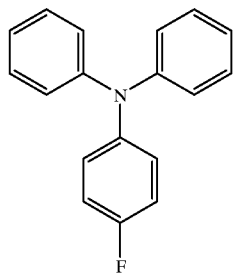
A-11
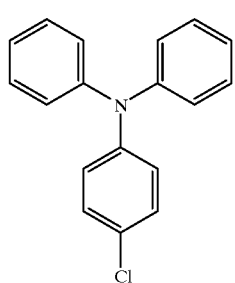
A-12
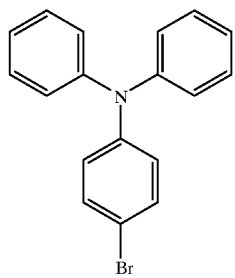
A-13
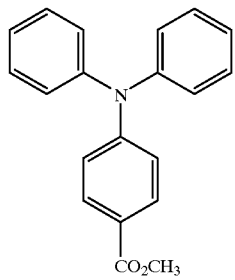
A-14
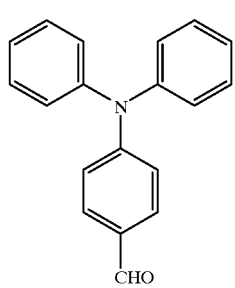
A-15

-continued
A-16
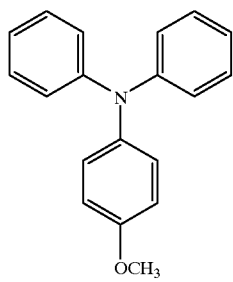
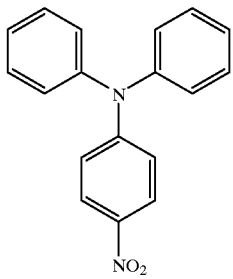
A-21
A-17
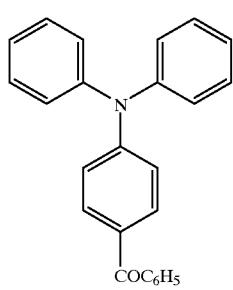
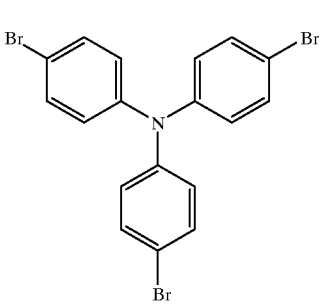
A-22
A-18
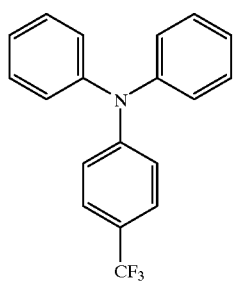
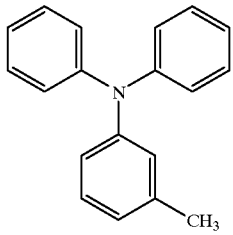
A-23
A-19
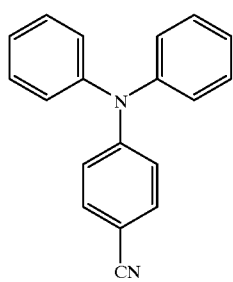
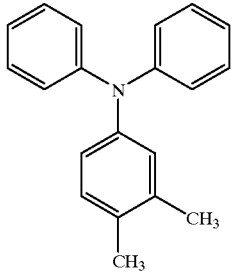
A-24
A-20
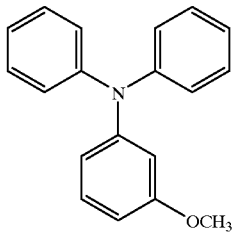
A-25

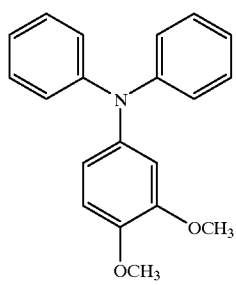 A-26
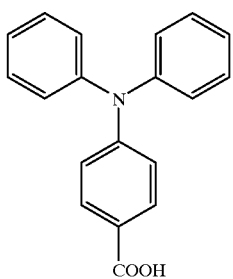 A-31
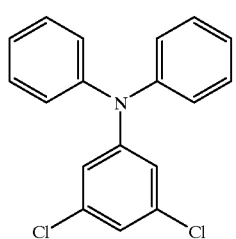 A-27
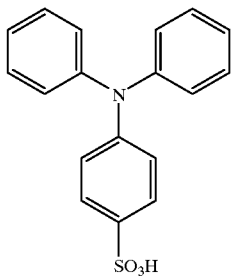 A-32
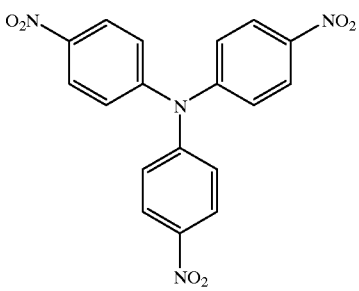 A-28
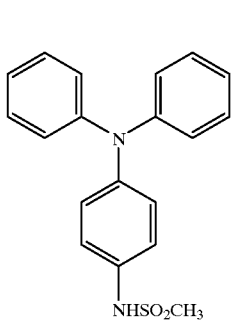 A-33
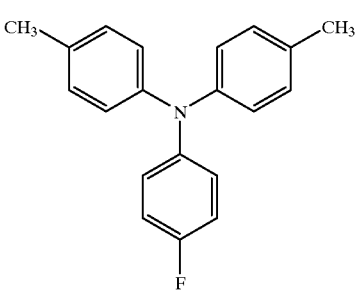 A-29
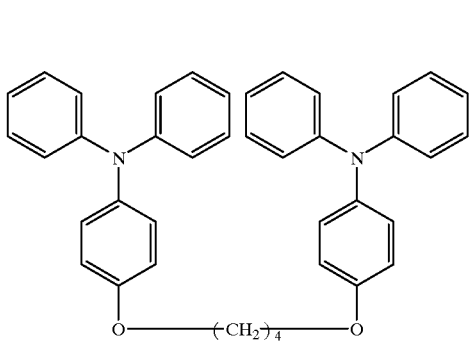 A-34
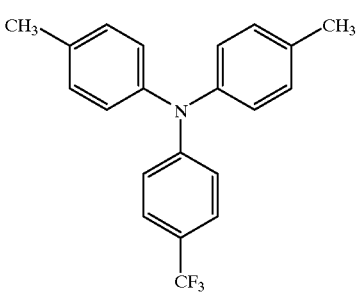 A-30
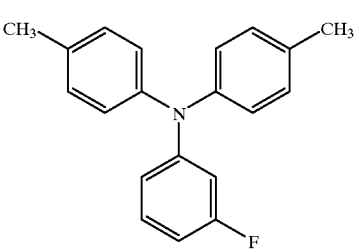 A-35

-continued
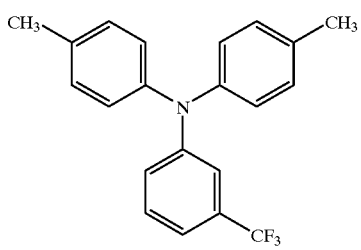
A-36
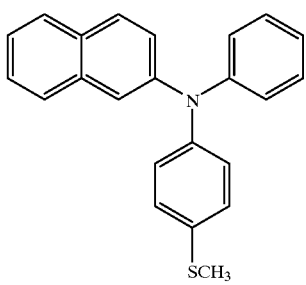
B-4
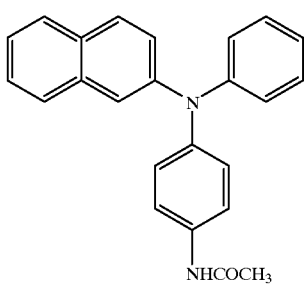
B-5
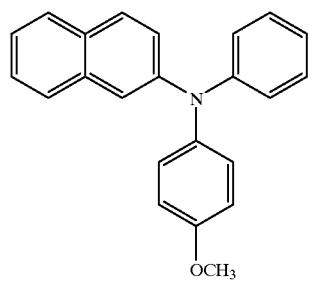
A-37
B-1
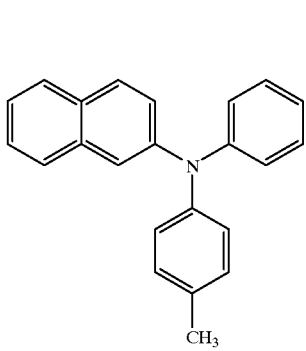
B-6
B-2
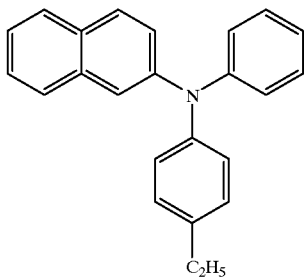
B-7
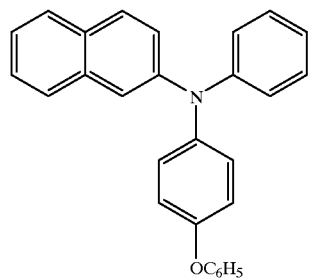
B-3
B-8

B-9 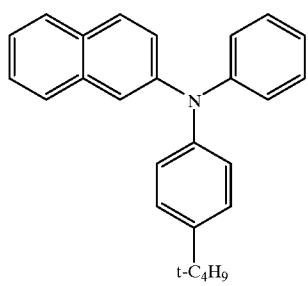 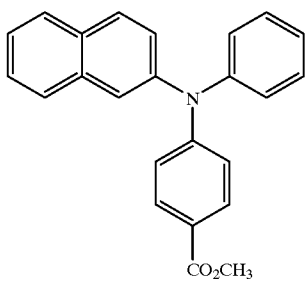 B-14
B-10 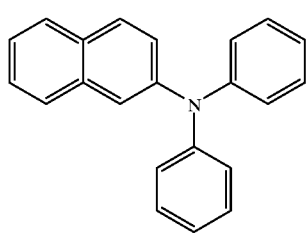 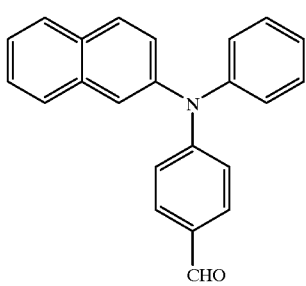 B-15
B-11 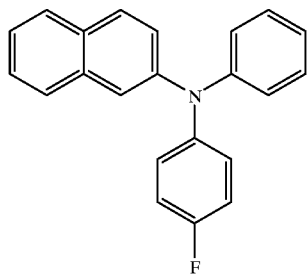 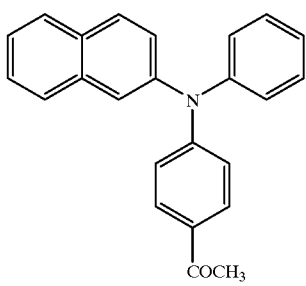 B-16
B-12 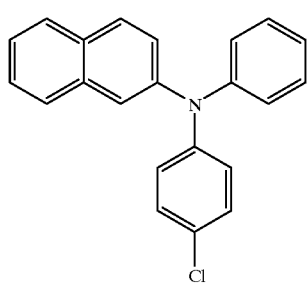 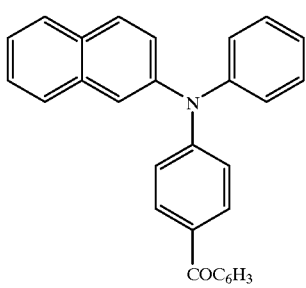 B-17
B-13 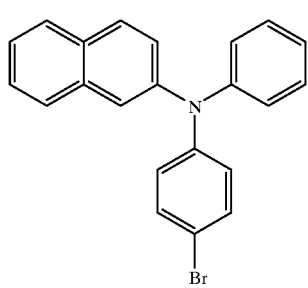 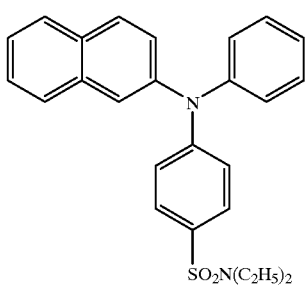 B-18

B-19
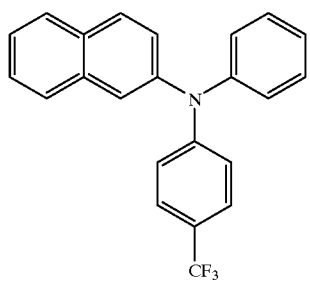
B-24
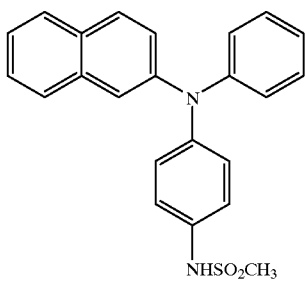
B-20
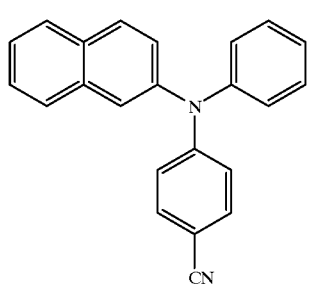
C-1
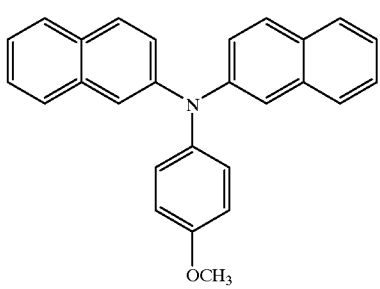
B-21
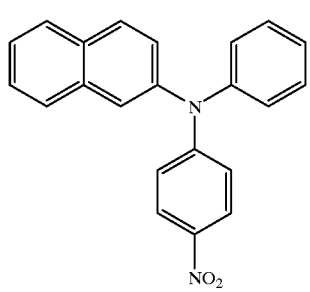
C-2
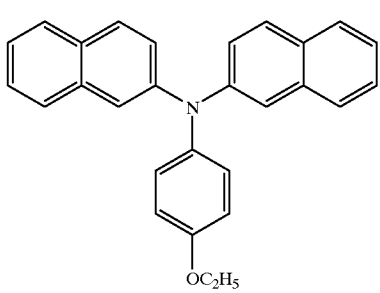
B-22
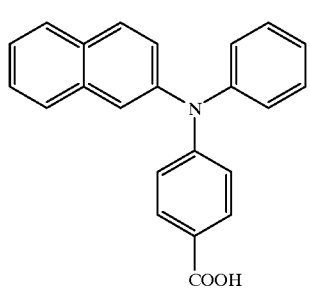
C-3
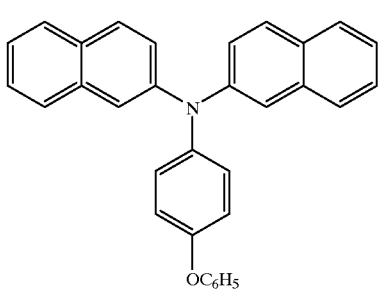
B-23
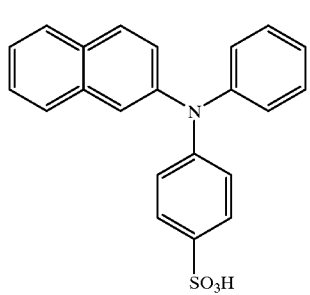
C-4
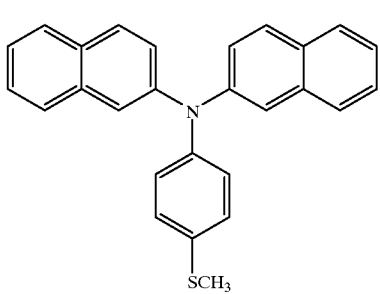

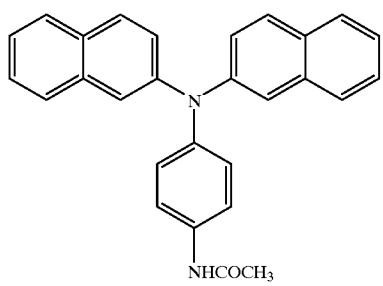 C-5
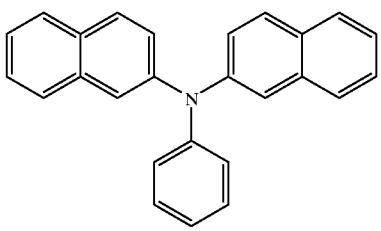 C-10
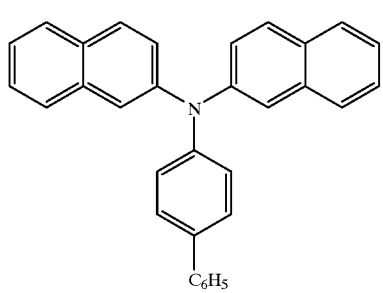 C-6
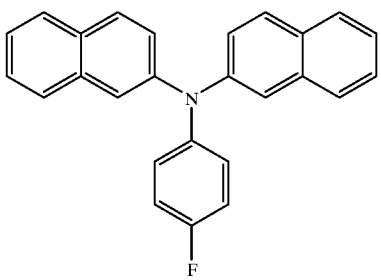 C-11
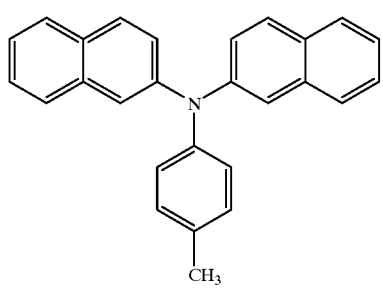 C-7
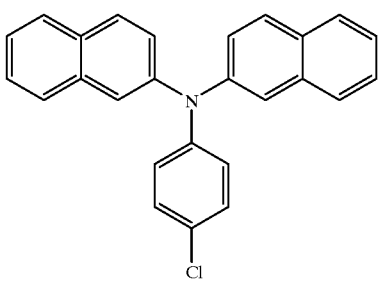 C-12
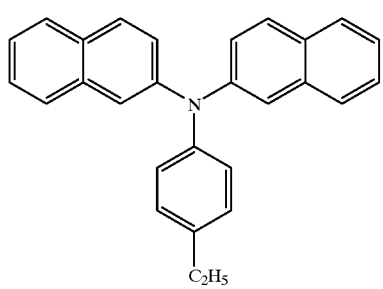 C-8
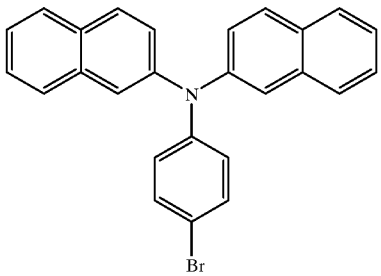 C-13
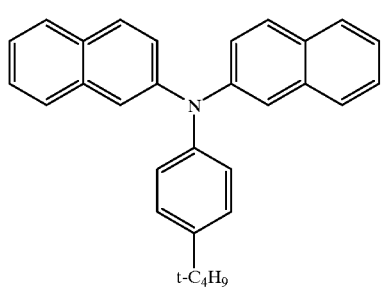 C-9
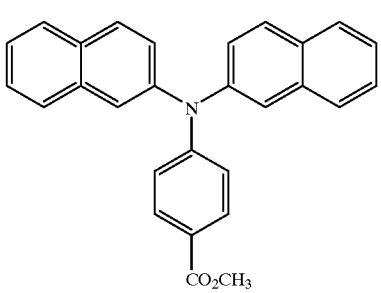 C-14

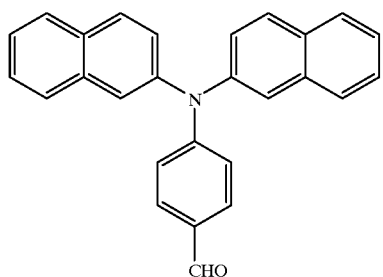
C-15
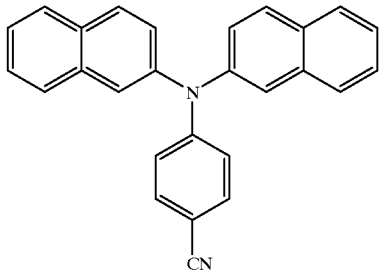
C-20
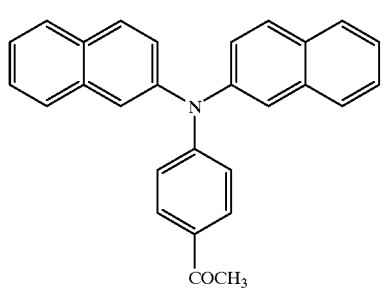
C-16
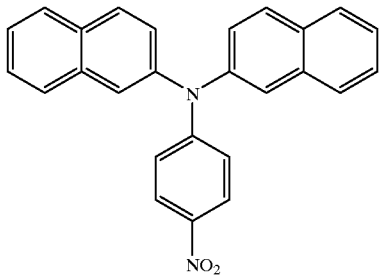
C-21
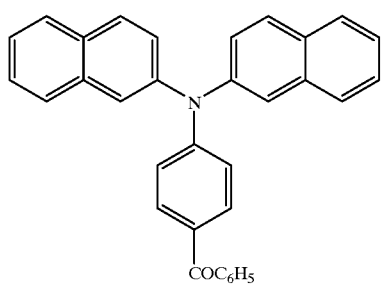
C-17
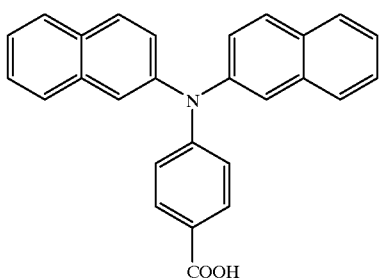
C-22
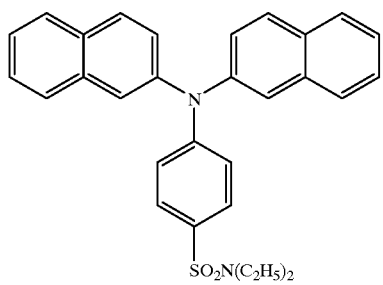
C-18
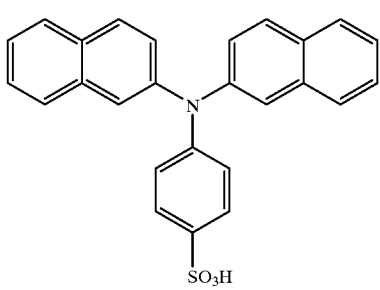
C-23
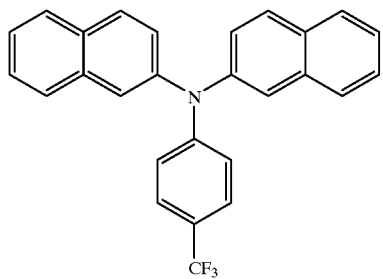
C-19
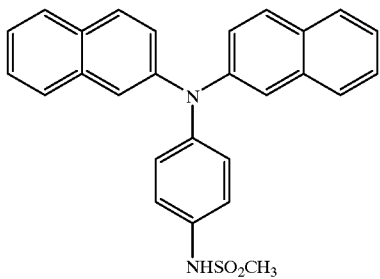
C-24

-continued
D-1
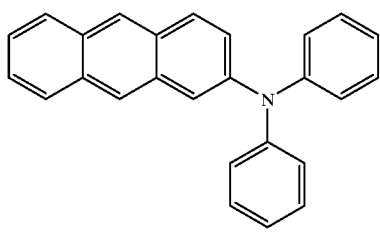
D-2
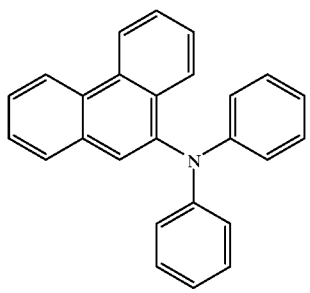
D-3
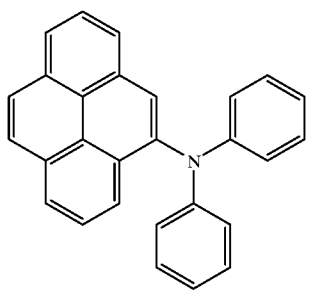
D-4
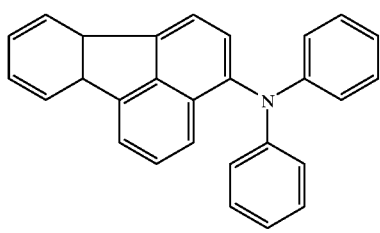
D-5
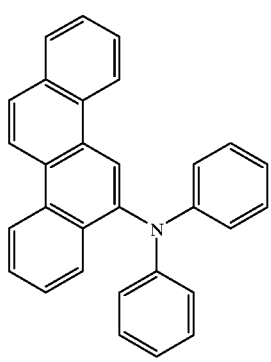
D-6
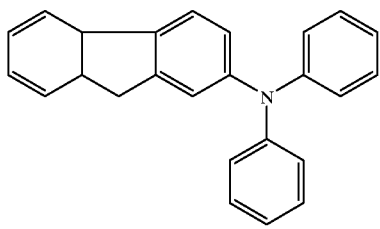
D-7
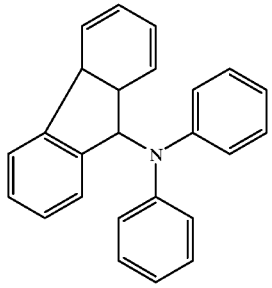
D-8
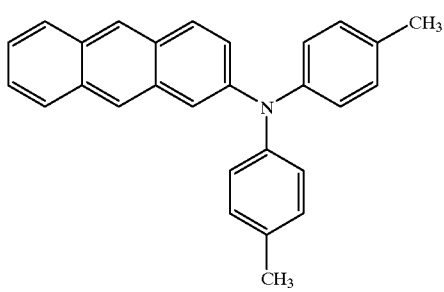
D-9
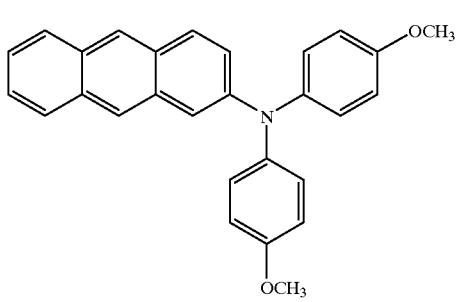
D-10
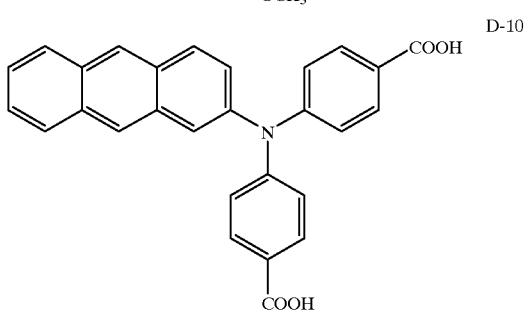
In formula (II), $R_{21}$, $R_{22}$, and $R_{23}$ have the same meaning as $R_{11}$, $R_{12}$, and $R_{13}$. Specific but non-limiting examples of the triarylamine compounds represented by formula (II) are shown below.

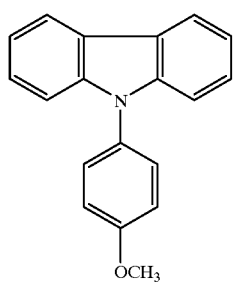
E-1
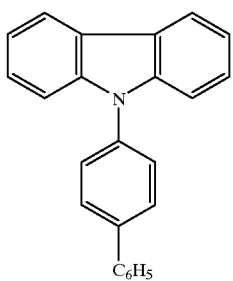
E-6
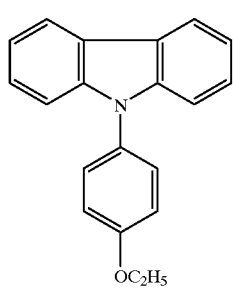
E-2
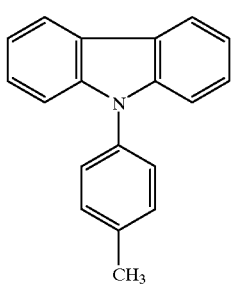
E-7
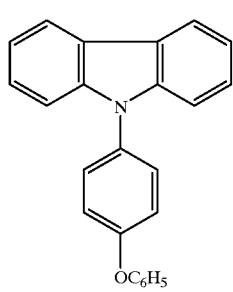
E-3
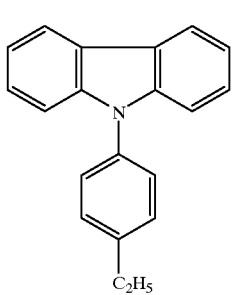
E-8
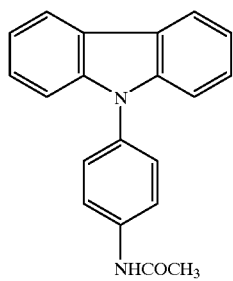
E-4
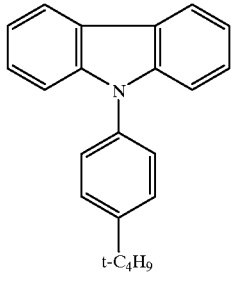
E-9
E-5
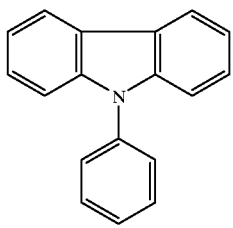
E-10

-continued
E-11
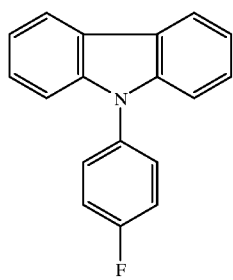
F
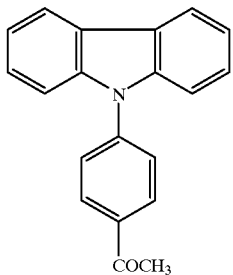
COCH₃
E-16
E-12
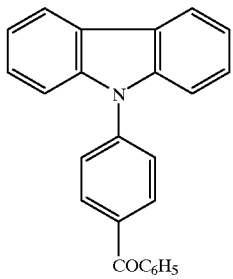
Cl
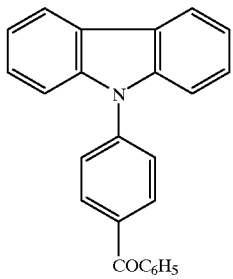
COC₆H₅
E-17
E-13
Br
SO₂N(C₂H₅)₂
E-18
E-14
CO₂CH₃
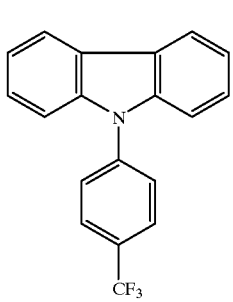
CF₃
E-19
E-15
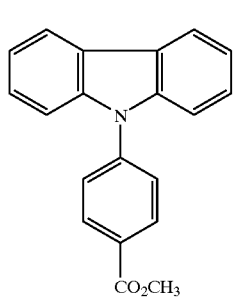
CHO
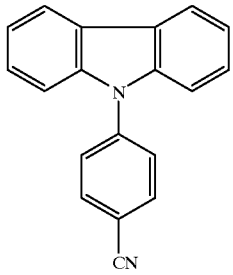
CN
E-20

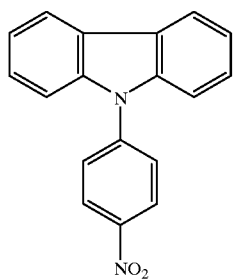
E-21
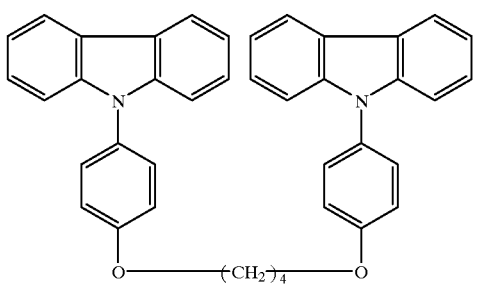
E-26
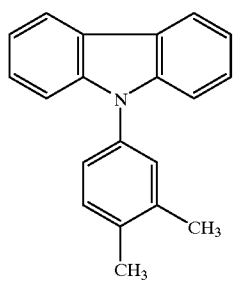
E-22
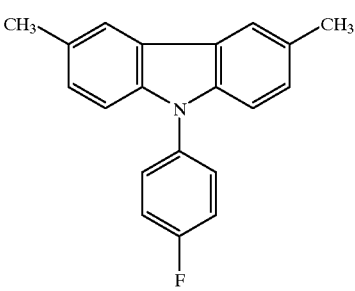
E-27
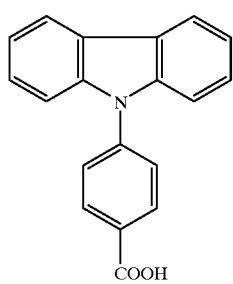
E-23
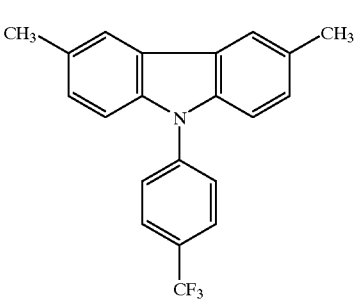
E-28
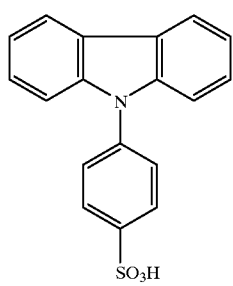
E-24
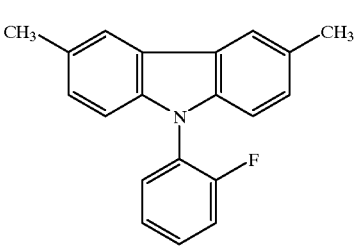
E-29
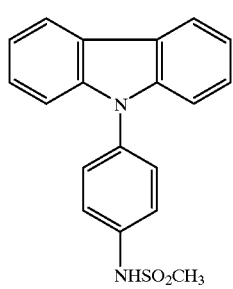
E-25
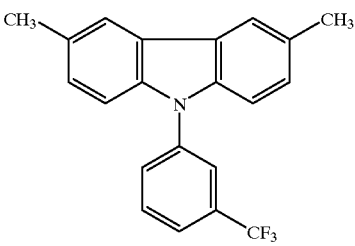
E-30

E-31 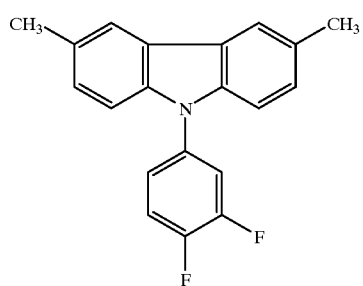
E-32 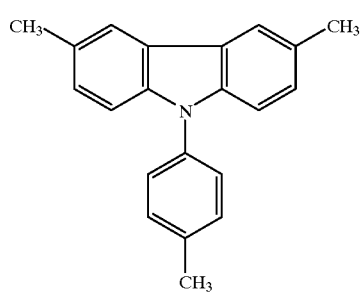
E-33 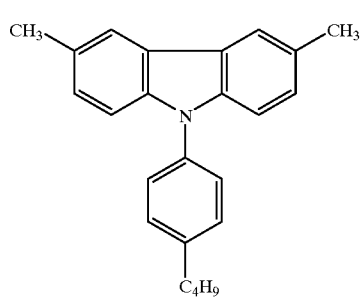
E-34 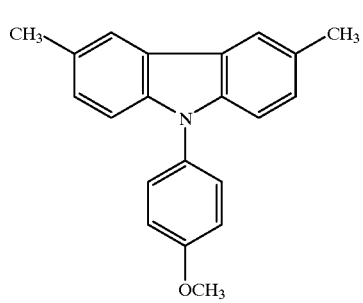
E-35 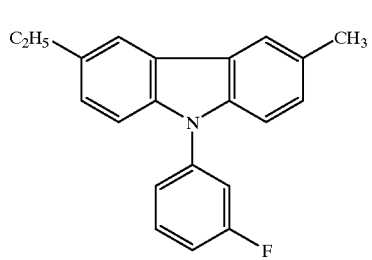
The triarylamine compounds other than those represented by formulae (I) and (II) which may be used in the present invention include the following compounds.
F-1 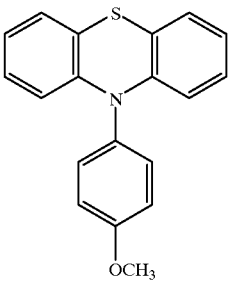
F-2 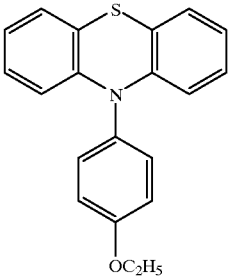
F-3 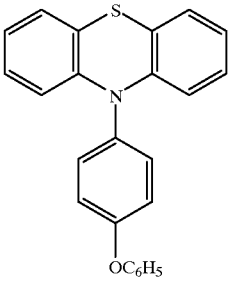
F-4 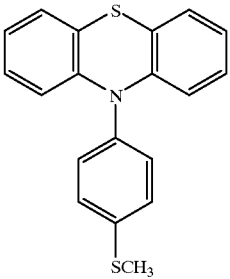
F-5 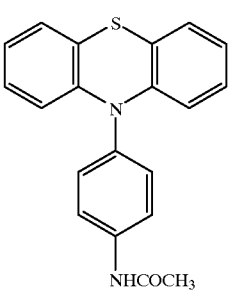

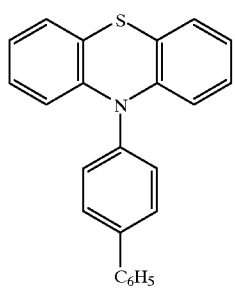
F-6
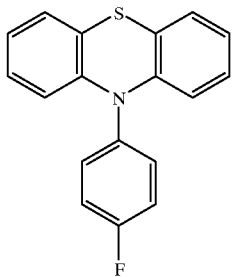
F-11
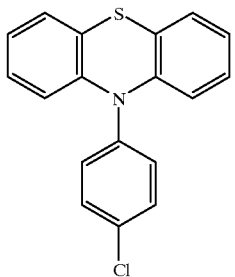
F-7
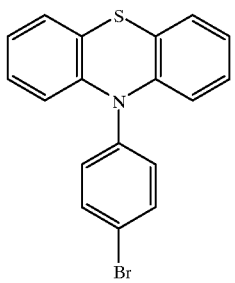
F-12
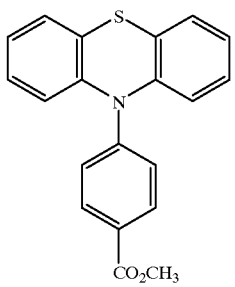
F-8
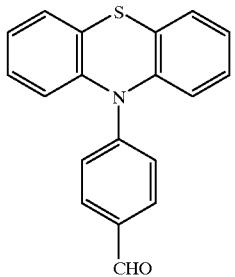
F-13
F-9
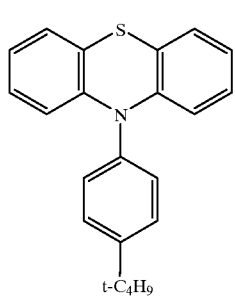
F-14
F-10
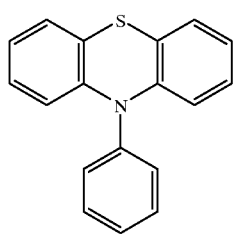
F-15

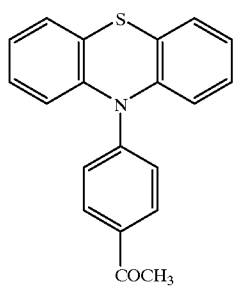
F-16
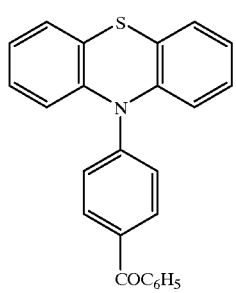
F-17
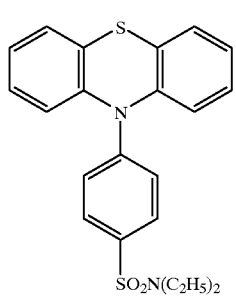
F-18
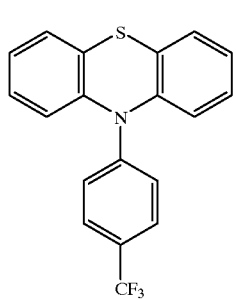
F-19
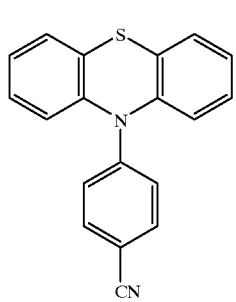
F-20
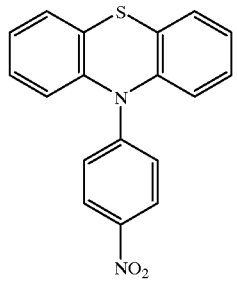
F-21
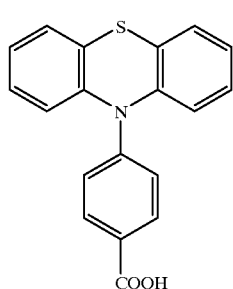
F-22
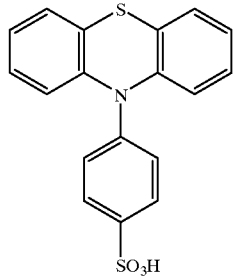
F-23
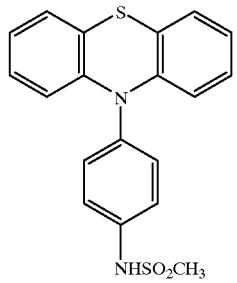
F-24
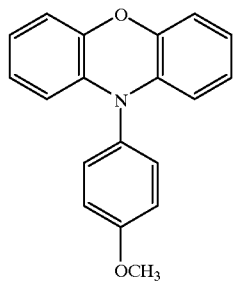
G-1

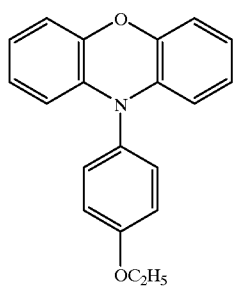
G-2
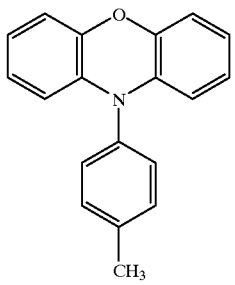
G-7
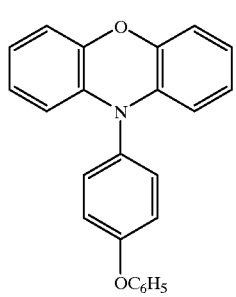
G-3
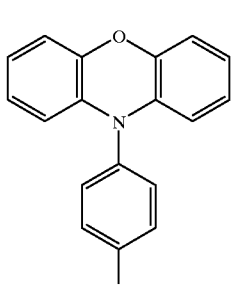
G-8
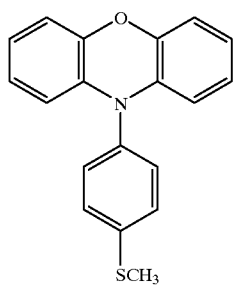
G-4
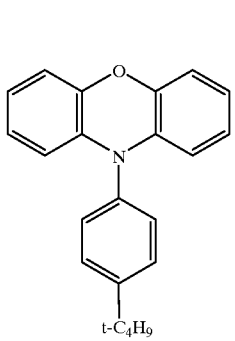
G-9
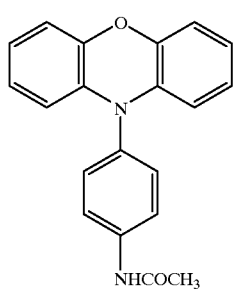
G-5
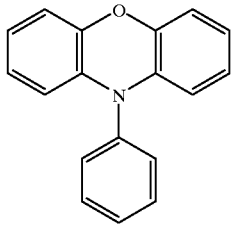
G-10
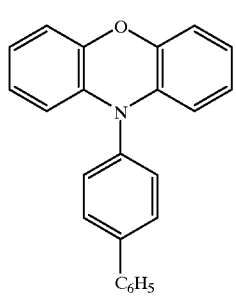
G-6
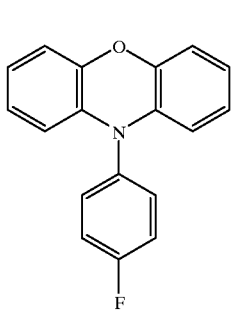
G-11

G-12 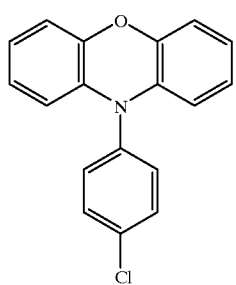
G-13 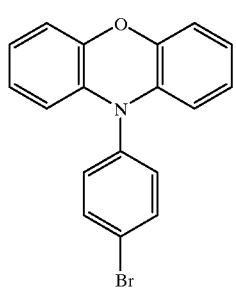
G-14 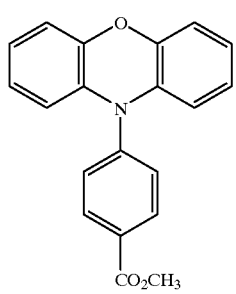
G-15 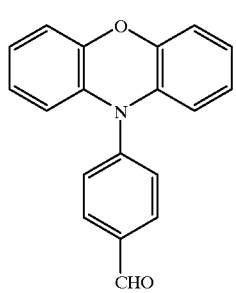
G-16 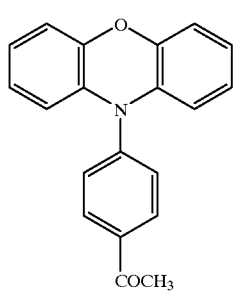
G-17 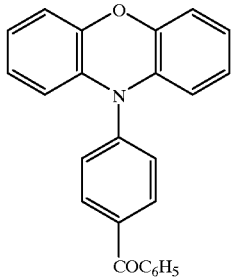
G-18 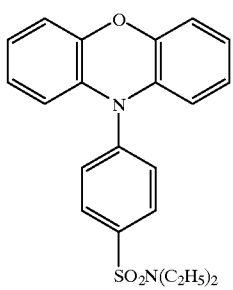
G-19 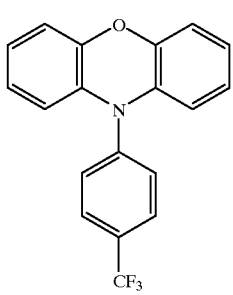
G-20 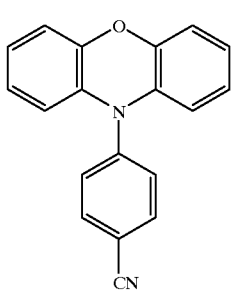
G-21 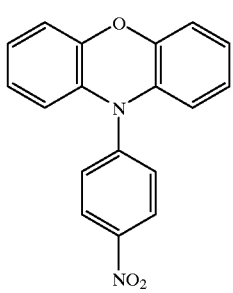

39
-continued

G-22
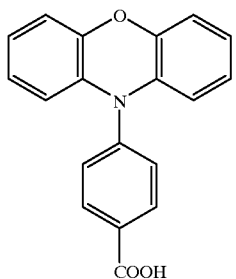

G-23
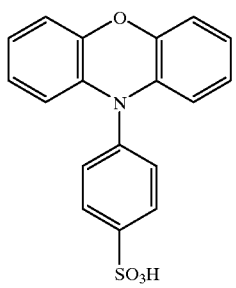

G-24
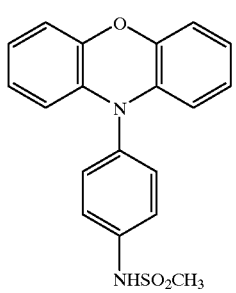

40

The organoboron compounds which can be used in the present invention preferably include those represented by formulae (III) and (IV):

(III)

wherein $R_{31}$, $R_{32}$, and $R_{33}$, which may be the same or different, each represent an alkyl group, a cycloalkyl group, an alkoxy group, an aralkyl group, an aryl group, an aryloxy group, an alkylthio group, an arylthio group, an acyloxy group, a sulfonyloxy group, an acyl group, or an oxycarbonyl group.

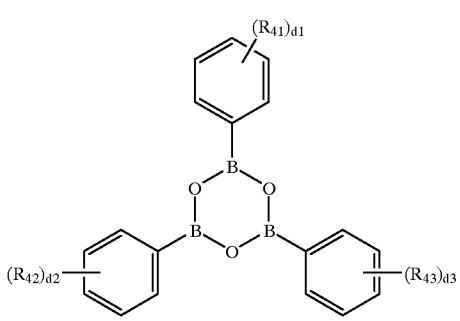

(IV)

wherein $R_{41}$, $R_{42}$, and $R_{43}$ have the same meaning as $R_{11}$, $R_{12}$ and $R_{13}$ in formula (I); and d1, d2, and d3 each represent 0 or an integer of 1 to 5.

In formula (III), $R_{31}$, $R_{32}$, and $R_{33}$ each preferably represent an alkyl group, an alkoxy group, an aralkyl group, an aryl group or an aryloxy group, with an aryl group or an aryloxy group being still preferred.

Specific but non-limiting examples of the organoboron compounds represented by formula (III) are shown below.

| | | | |
|---|---|---|---|
| H-1 | $(CH_3O)_3B$ | H-2 | $(C_2H_5O)_3B$ |
| H-3 | $(C_3H_7O)_3B$ | H-4 | $(C_4H_9O)_3B$ |
| H-5 | $(C_5H_{11}O)_3B$ | H-6 | $(C_6H_{13}O)_3B$ |
| H-7 | $(C_7H_{15}O)_3B$ | H-8 | $(C_8H_{17}O)_3B$ |
| H-9 | $(C_9H_{19}O)_3B$ | H-10 | $(C_{10}H_{21}O)_3B$ |
| H-11 | $(C_{11}H_{23}O)_3B$ | H-12 | $(C_{12}H_{25}O)_3B$ |
| H-13 | $(ClCH_2CH_2O)_3B$ | H-14 | $(CH_3OCH_2O)_3B$ |
| H-15 | $(CH_3OCH_2CH_2O)_3B$ | H-16 | $(C_4H_9OCH_2CH_2O)_3B$ |

H17  H-18 $(CH_3(CH_2)_8COCH_2CH_2O)_3B$

H-19  H-20 $(CH_2=CHCH_2O)_3B$

H-21 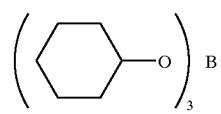 H-22 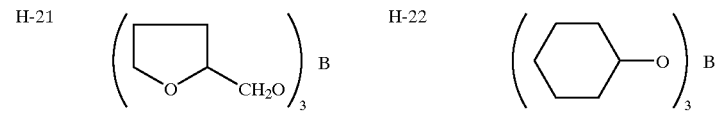

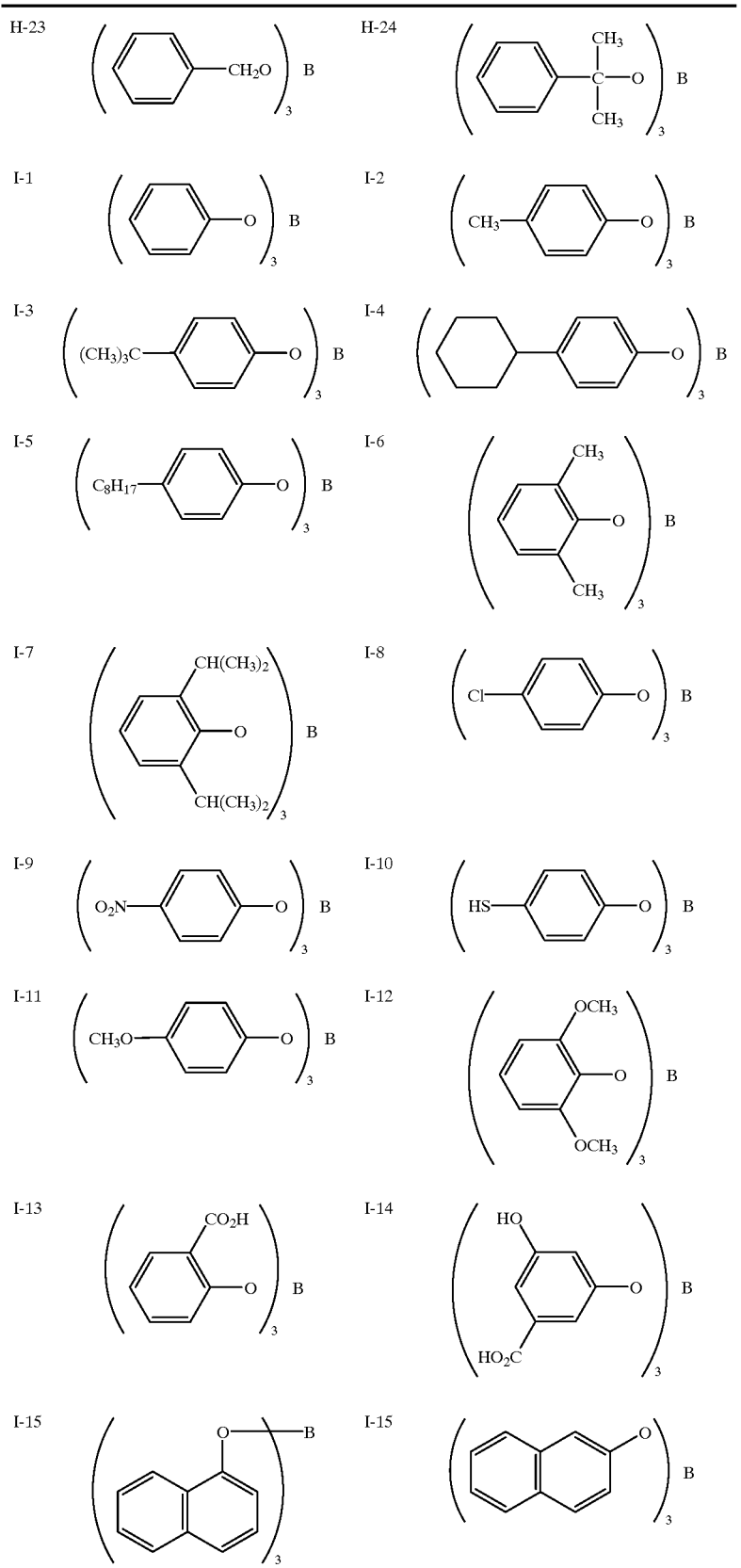

-continued
J-1  CH₃O—B(C₂H₅)₂
J-2  CH₃B(OCHCH₃)₂ (with CH₃ on OCH)
J-3  C₄H₉B(OCHCH₃)₂ (with CH₃ on OCH)
J-4  (CH₃N)₃B (with CH₃)
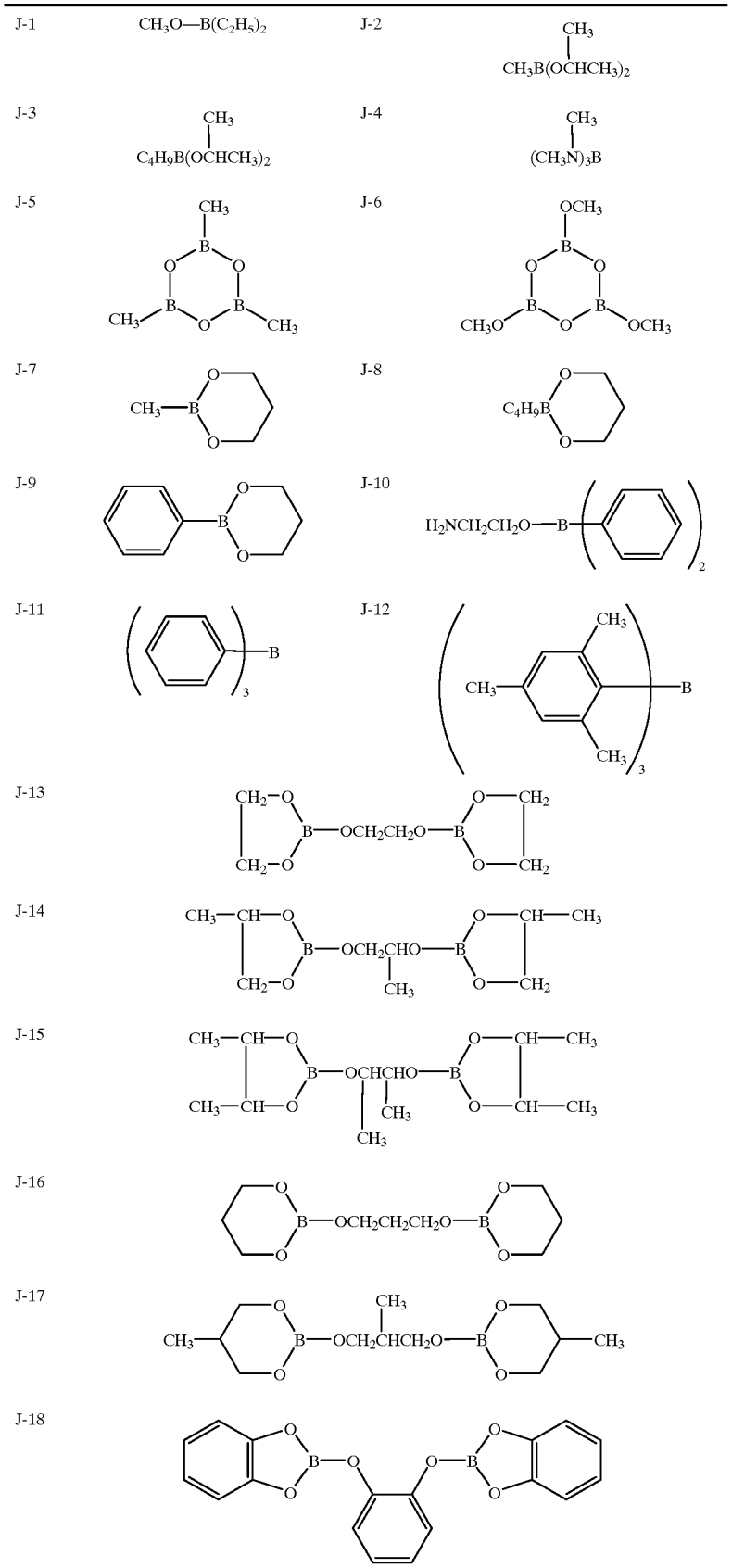

-continued

J-19 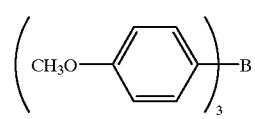  J-20 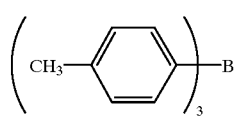

J-21 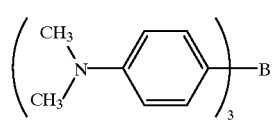  J-22 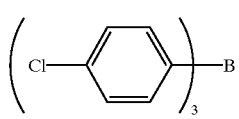

J-23 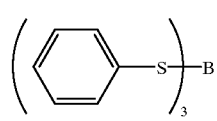

In formula (IV), $R_{41}$, $R_{42}$, and $R_{43}$ each preferably represent an alkyl group, a halogen atom, a cyano group, a nitro group, an acyl group, a sulfonyl group or an alkoxy group, with a fluorine atom or a fluorine-substituted alkyl group (e.g., trifluoromethyl) being still preferred.

Specific but non-limiting examples of the organoboron compounds represented by formula (IV) are shown below.

X-1
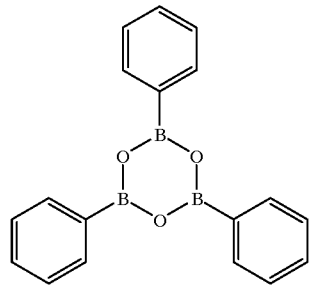

X-2
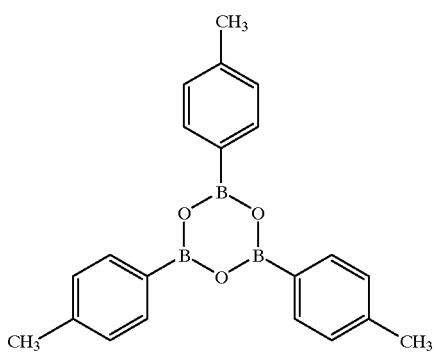

X-3
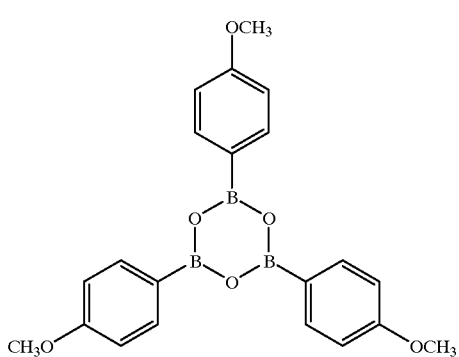

X-4
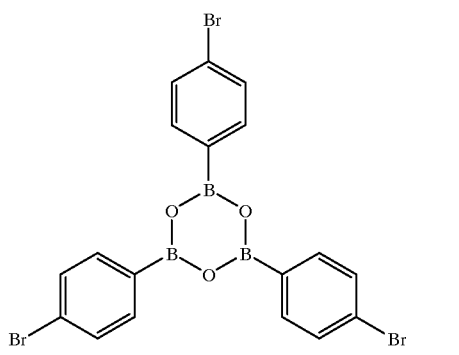

X-5
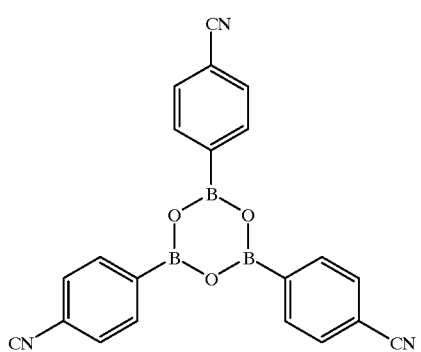

X-6
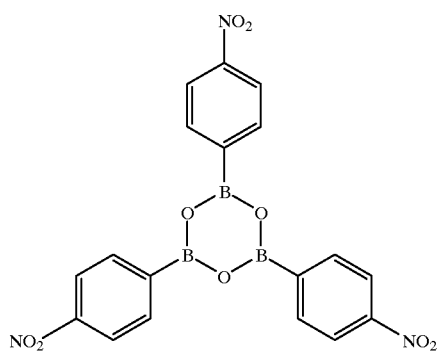
X-7
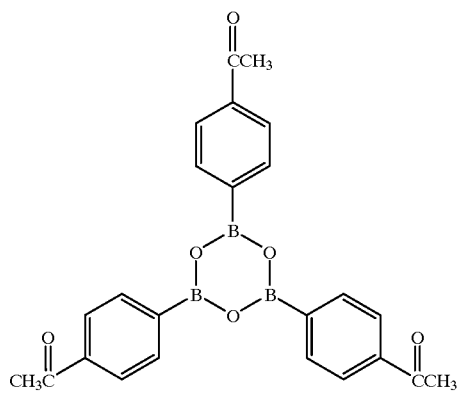
X-8
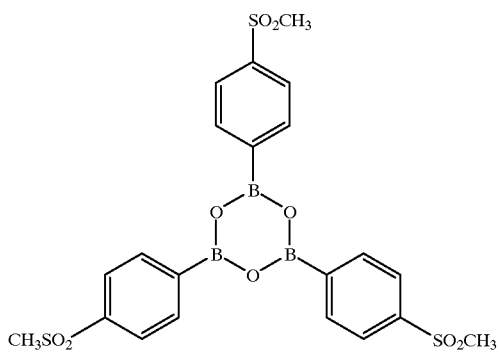
X-9
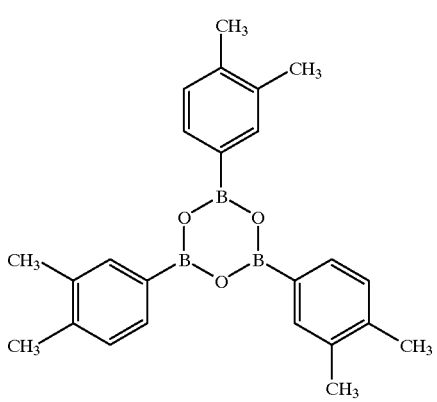
X-10
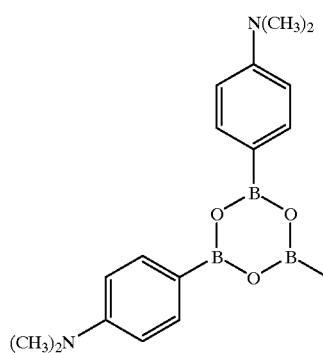
X-11
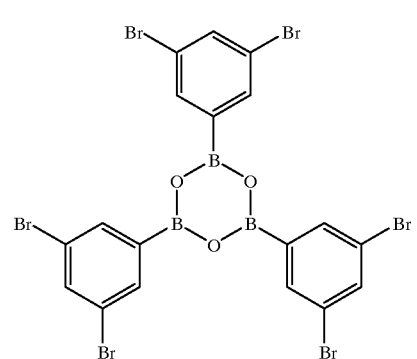
X-12
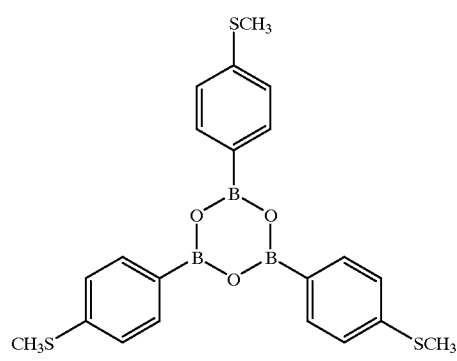
X-13
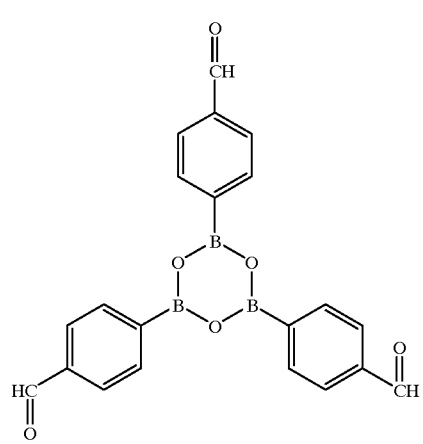

X-14
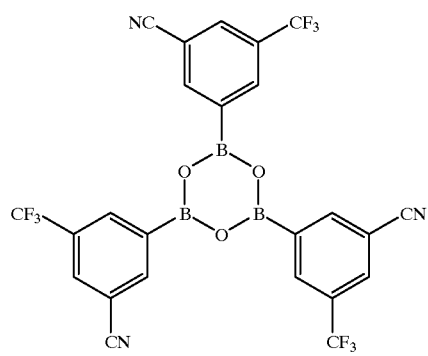
X-15
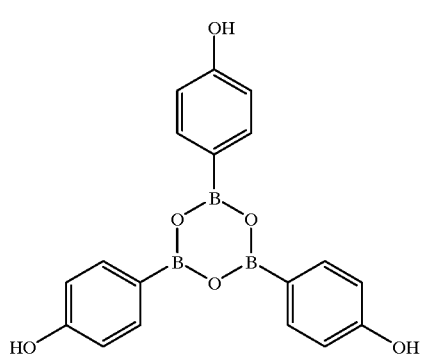
X-16
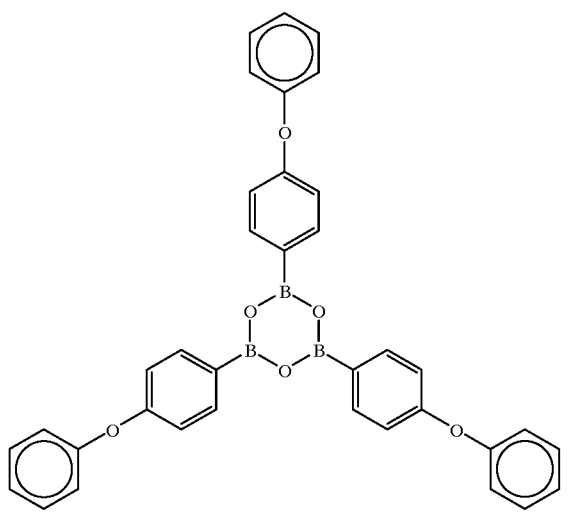
Y-1
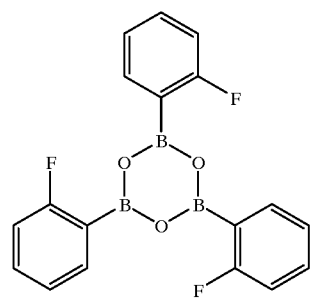
Y-2
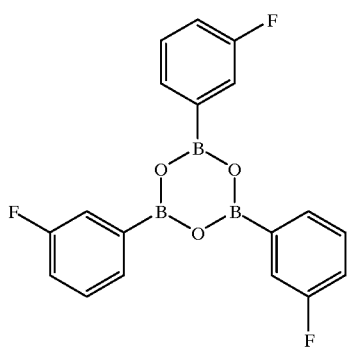
Y-3
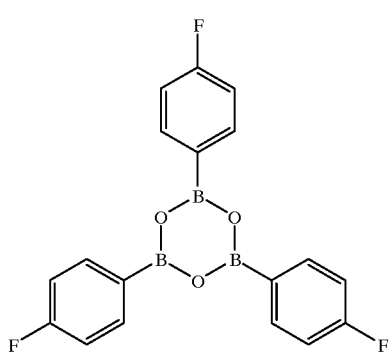
Y-4
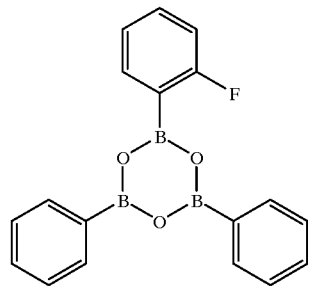
Y-5
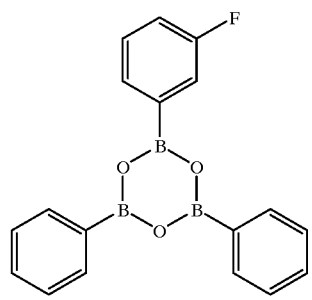

-continued
Y-6
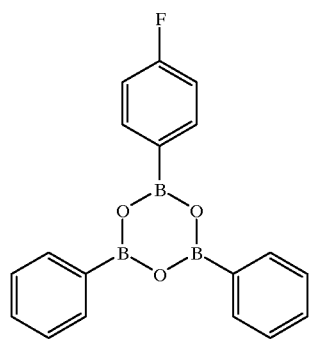
Y-10
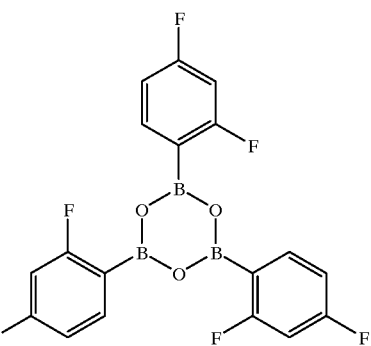
Y-7
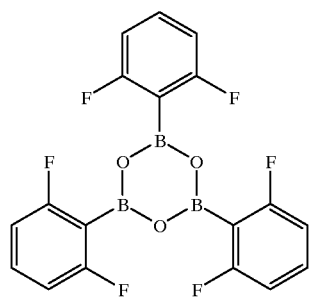
Y-11
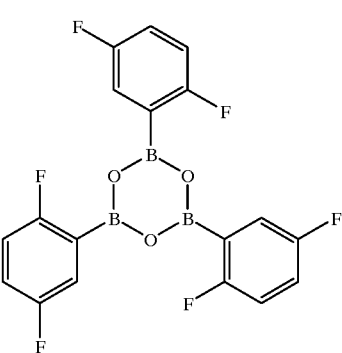
Y-8
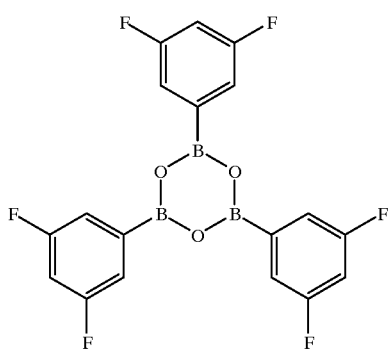
Y-12
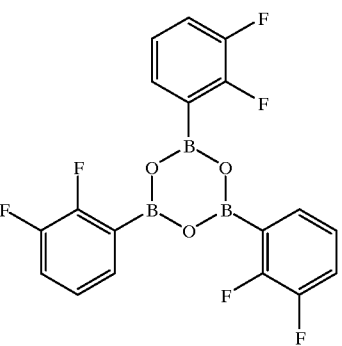
Y-9
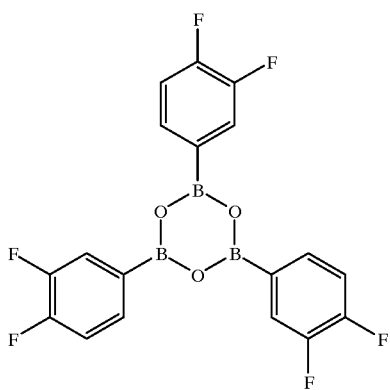
Y-13
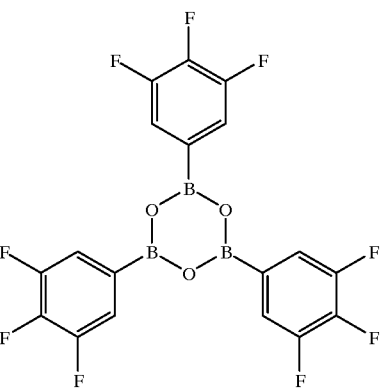

Y-14
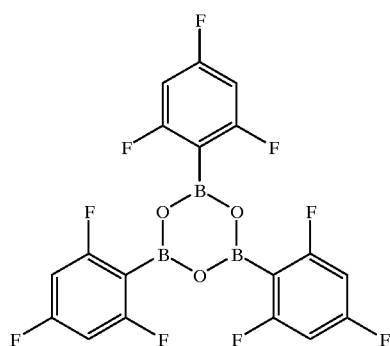
Y-15
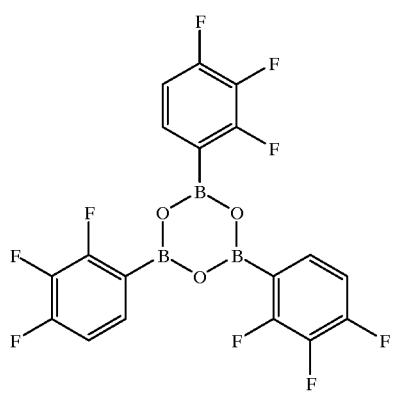
Y-16
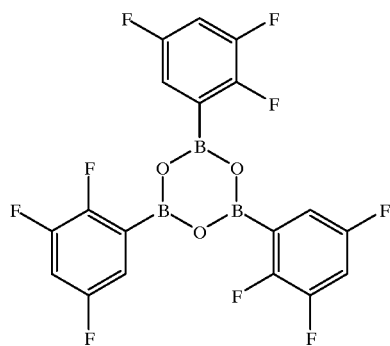
Y-17
Y-18
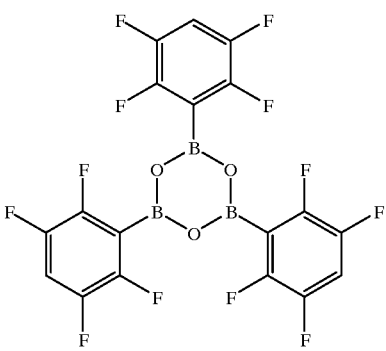
Y-19
Y-20
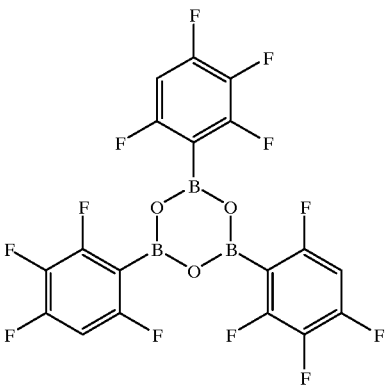
Y-21
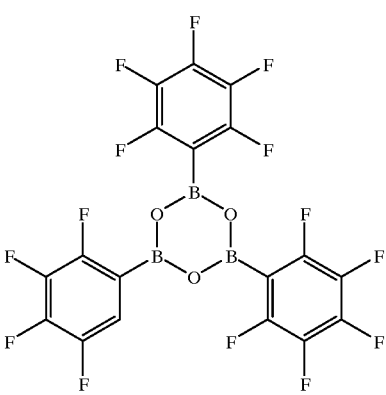

-continued
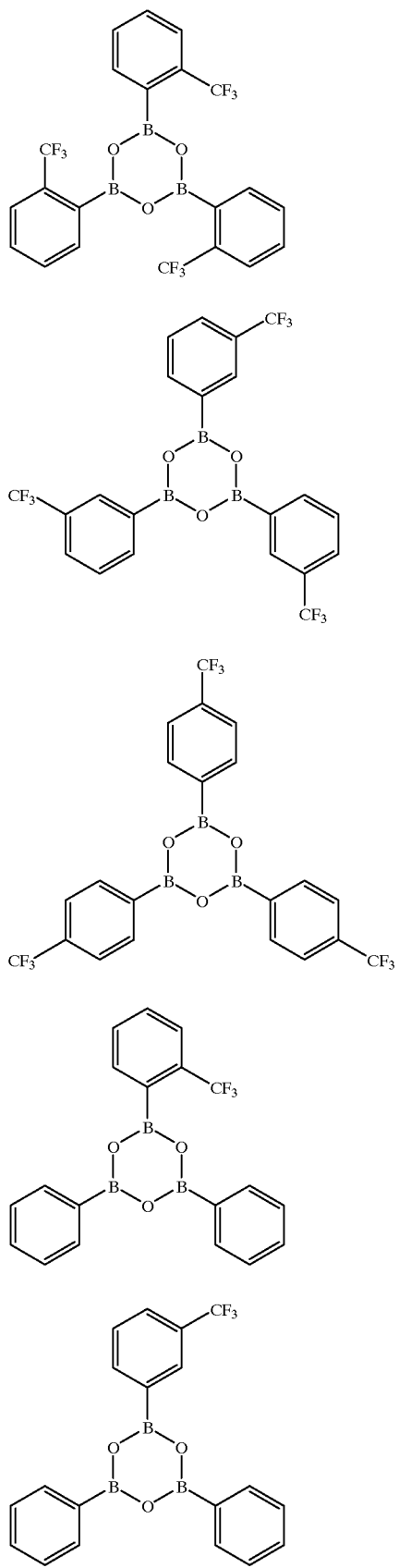
Z-1
Z-2
Z-3
Z-4
Z-5
-continued
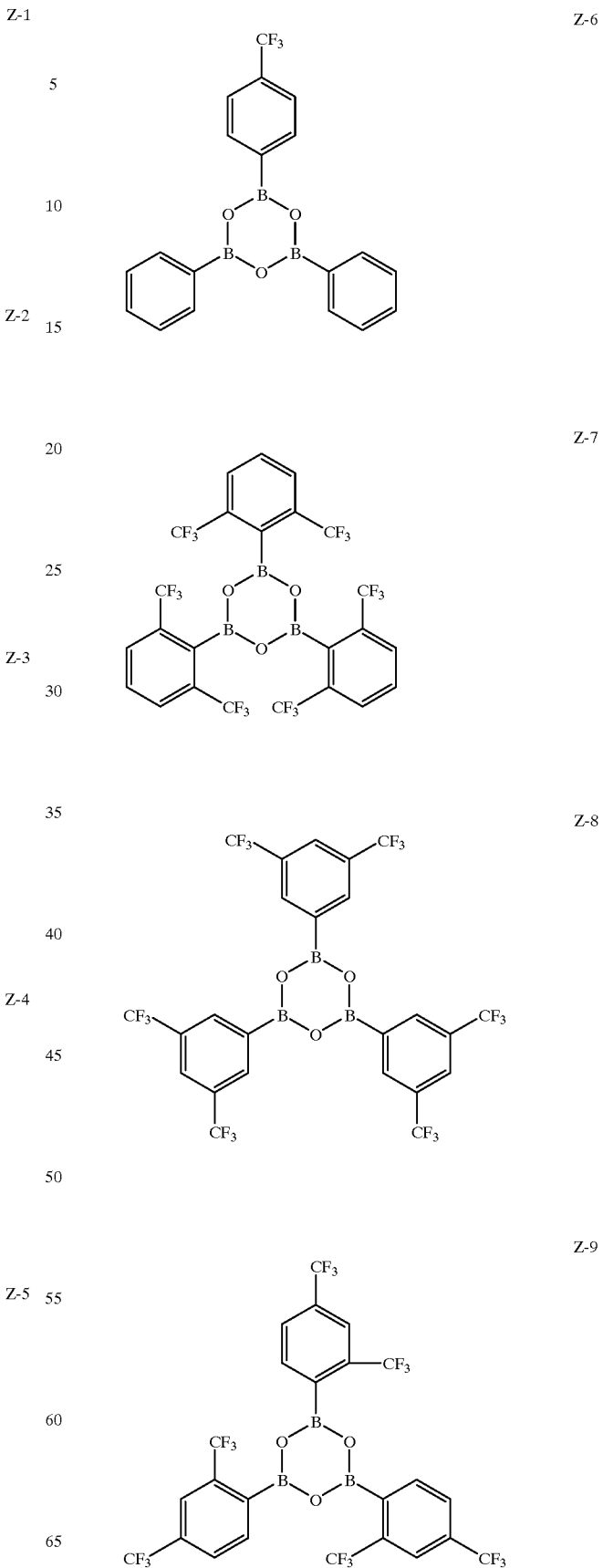
Z-6
Z-7
Z-8
Z-9

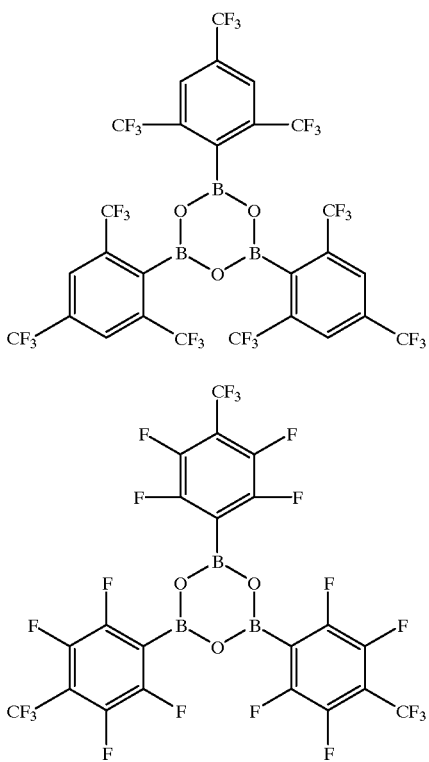

The triarylamine compound and the organoboron compound are preferably combined in such a manner that at least one compound of formula (I) and at least one compound of formula (III) are combined; at least one compound of formula (I) and at least one compound of formula (IV) are combined; at least one compound of formula (II) and at least one compound of formula (III) are combined; or at least one compound of formula (II) and at least one compound of formula (IV) are combined.

While the above-described compounds may be incorporated into any elements constituting a nonaqueous secondary battery, they are preferably added to an electrode active material or an electrolytic solution (i.e., a liquid electrolyte). When incorporated into an electrode, they are preferably added in a total concentration of 0.01 to 5% by weight, particularly 0.1 to 2% by weight, based on the electrode active material. When added to an electrolytic solution, they are preferably contained in a total concentration of 0.001 to 0.1 mol/l, particularly 0.001 to 0.05 mol/l.

A preferred molar ratio of the triarylamine compound to the organoboron compound is 0.1 to 10.

The electrolytic solution which can be used in the present invention is generally made up of a solvent and a supporting salt soluble in the solvent, preferably a lithium salt composed of a lithium cation and a counter anion.

Examples of suitable solvents for the electrolytic solution include aprotic organic solvents, such as propylene carbonate, ethylene carbonate, butylene carbonate, dimethyl carbonate, diethyl carbonate, methylethyl carbonate, γ-butyrolactone, methyl formate, methyl acetate, 1,2-dimethoxyethane, tetrahydrofuran, 2-methyltetrahydrofuran, dimethyl sulfoxide, 1,3-dioxolane, formamide, dimethyl-formamide, dioxane, acetonitrile, nitromethane, ethyl monoglyme, phosphoric acid triesters, trimethoxymethane, dioxolane derivatives, sulfolane, 3-methyl-2-oxazolidinone, propylene carbonate derivatives, tetrahydrofuran derivatives, diethyl ether, and 1,3-propanesultone. These organic solvents can be used either individually or as a mixture of two or more thereof. Preferred among them are carbonate based solvents, particularly those comprising a cyclic carbonate and/or an acyclic carbonate.

Examples of the cyclic carbonate preferably includes ethylene carbonate and propylene carbonate, and examples of the acyclic carbonate preferably includes diethyl carbonate, dimethyl carbonate, and methylethyl carbonate.

Examples of the lithium salt which is dissolved in the solvent include $LiClO_4$, $LiBF_4$, $LiPF_6$, $LiCF_3CO_2$, $LiAsF_6$, $LiSbF_6$, $LiB_{10}C_{10}$, fluorosulfonic acids represented by formula: $LiOSO_2CnF_{2n+1}$ (n: positive integer of 6 or smaller), imide salts represented by formula: $LiC(SO_2C_nF_{2n+1})(SO_2C_mF_{2m+1})$ (m, n: positive integer of 6 or smaller), methide salts represented by formula $LiN(SO_2C_pF_{2p+1})(SO_2C_qF_{2q+1})(SO_2C_rF_{2r+1})$ (p, q, r: positive integer of 6 or smaller), lower fatty acid salts of lithium, $LiAlCl_4$, $LiCl$, $LiBr$, $LiI$, chloroboran lithium, and lithium tetraphenylborate. These Li salts can be used individually or as a mixture of two or more thereof. Among these, $LiBF_4$, $LiPF_6$ or a mixture thereof is preferred. While not limiting, these supporting salts are dissolved in a solvent in a concentration of 0.2 to 3 mol per liter of the electrolytic solution.

An electrolytic solution (i.e., a liquid electrolyte) comprising an appropriately mixed solvent of ethylene carbonate, propylene carbonate, 1,2-dimethoxyethane, dimethyl carbonate, and/or diethyl carbonate having dissolved therein at least one of $LiCF_3SO_3$, $LiClO_4$, $LiBF_4$, and $LiPF_6$ is preferred. An electrolytic solution comprising a mixed solvent of propylene carbonate or ethylene carbonate and at least one of 1,2-dimethoxyethane and diethyl carbonate, having dissolved therein at least one of $LiCF_3SO_3$, $LiClO_4$ and $LiBF_4$ and $LiPF_6$ is still preferred. An electrolytic solution containing at least ethylene carbonate and $LiPF_6$ is particularly preferred. The amount of the electrolytic solution to be put in a battery is not particularly limited and is decided appropriately according to the amount of the electrode materials or the size of the battery.

The negative and positive electrodes of the nonaqueous secondary battery according to the present invention are prepared by applying a positive electrode active material mixture and a negative electrode material mixture to the respective current collectors. The positive or negative electrode material mixture contains a positive electrode active material or a negative electrode material and, in addition, an electrical conducting agent, a binder, a dispersant, a filler, an ion conducting agent, a pressure increasing agent and other various additives.

The negative electrode material which can be used in the present invention preferably comprises a predominantly amorphous chalcogenide and/or a predominantly amorphous oxide each containing at least one element selected from the groups 1, 2, 13, 14, and 15 of the Periodic Table. It is preferred for the negative electrode material used in the present invention to be predominantly amorphous at the time of assembly into a battery. The terminology "predominantly amorphous" as used herein means "to have a broad scattering band having a peak at 20 to 40° in terms of 2Θ in X-ray diffractometry using CuKα rays, possibly exhibiting a diffraction line assigned to a crystalline structure". It is preferable that the maximum intensity of the band assigned to a crystalline structure which appears at 40 to 70° in terms of 2Θ is not higher than 500 times, still preferably not higher than 100 times, particularly preferably not higher than 5 times, the peak intensity of the broad scattering band which appears at 20 to 40° in terms of 2Θ. It is particularly preferred that the negative electrode material has no diffraction line attributed to a crystalline structure.

The above-mentioned negative electrode material preferably includes those represented by formula (V):

$$M^1M^2_pM^4_qM^6_r \quad (V)$$

wherein $M^1$ and $M^2$, which may be same or different, each represent at least one element selected from the group consisting of Si, Ge, Sn, Pb, P, B, Al, and Sb; $M^4$ represents at least one element selected from the group consisting of Li, Na, K, Rb, Cs, Mg, Ca, Sr, and Ba; $M^6$ represents at least one element selected from the group consisting of O, S, and Te; p and q each represent a number of from 0.001 to 10; and r represents a number of from 1.00 to 50.

In formula (V), $M^1$ and $M^2$ are preferably selected from the group consisting of Si, Ge, Sn, P, B, and Al, particularly preferably Si, Sn, P, B and Al; $M^4$ is preferably selected from the group consisting of K, Cs, Mg, Ba and Ca, particularly preferably Cs and Mg; $M^6$ is preferably selected from O and S, particularly O; p and q are each preferably from 0.01 to 5, particularly from 0.01 to 2; and r is preferably from 1.00 to 26, particularly from 1.02 to 6. The valencies of $M^1$ and $M^2$ are not particularly limited. Where $M^1$ or $M^2$ represents two or more elements, the valencies of the elements may be the same or different. The molar ratio of $M^2$ or $M^4$ to $M^1$ can vary continuously within a range of from 0.001 to 10, and the amount of $M^6$ (i.e., the value r in formula (V)) can continuously vary accordingly. of the compounds represented by formula (V) those in which $M^1$ is Sn, i.e., the compounds represented by formula (VI) are preferred.

$$SnM^3_pM^5_qM^7_r \quad (VI)$$

wherein $M^3$ represents at least one element selected from the group consisting of Si, Ge, Pb, P, B, and Al; $M^5$ represents at least one element selected from the group consisting of Li, Na, K, Rb, Cs, Mg, Ca, Sr, and Ba; $M^7$ is at least one element selected from O and S; p and q each represent a number of from 0.001 to 10; and r represents a number of from 1.00 to 50.

In formula (VI), $M^3$ is preferably selected from the group consisting of Si, Ge, P, B, and Al, particularly preferably Si, P, B, and Al; $M^5$ is preferably selected from Cs and Mg, and is still preferably Mg; $M^7$ is preferably O; p and q are preferably 0.01 to 5, still preferably 0.01 to 1.5, particularly preferably 0.7 to 1.5; and r is preferably 1.00 to 26, still preferably 1.02 to 6. Specific but non-limiting examples of the negative electrode materials include:

$SnAl_{0.4}B_{0.5}P_{0.5}K_{0.1}O_{3.65}$, $SnAl_{0.4}B_{0.5}P_{0.5}Na_{0.2}O_{3.7}$ $SnAl_{0.4}B_{0.3}P_{0.5}Rb_{0.2}O_{3.4}$, $SnAl_{0.4}B_{0.5}P_{0.5}Cs_{0.1}O_{3.65}$, $SnAl_{0.4}B_{0.5}P_{0.5}K_{0.1}Ge_{0.05}O_{3.85}$, $SnAl_{0.4}B_{0.5}P_{0.5}K_{0.1}Mg_{0.1}Ge_{0.02}O_{3.83}$, $SnAl_{0.4}B_{0.4}P_{0.4}O_{3.2}$, $SnAl_{0.3}B_{0.5}P_{0.2}O_{2.7}$, $SnAl_{0.3}B_{0.5}P_{0.2}O_{2.7}$, $SnAl_{0.4}B_{0.5}P_{0.3}Ba_{0.08}Mg_{0.08}O_{3.26}$, $SnAl_{0.4}B_{0.4}P_{0.4}Ba_{0.08}O_{3.28}$, $SnAl_{0.4}B_{0.5}P_{0.5}O_{3.6}$, $SnAl_{0.4}B_{0.5}P_{0.5}Mg_{0.1}O_{3.7}$, $SnAl_{0.5}B_{0.4}P_{0.5}Mg_{0.1}F_{0.2}O_{3.65}$, $SnB_{0.5}P_{0.5}Li_{0.4}Mg_{0.1}F_{0.2}O_{3.05}$, $SnB_{0.5}P_{0.5}K_{0.1}Mg_{0.1}F_{0.2}O_{3.05}$ $SnB_{0.5}P_{0.5}K_{0.05}Mg_{0.05}F_{0.1}O_{3.03}$, $SnB_{0.5}P_{0.5}K_{0.05}Mg_{0.1}F_{0.2}O_{3.03}$, $SnAl_{0.4}B_{0.5}P_{0.5}Cs_{0.1}Mg_{0.1}F_{0.2}O_{3.65}$, $SnB_{0.5}P_{0.5}Cs_{0.05}Mg_{0.05}F_{0.1}O_{3.03}$, $SnB_{0.5}P_{0.5}Mg_{0.1}F_{0.1}O_{3.05}$, $SnB_{0.5}P_{0.5}Mg_{0.1}F_{0.2}O_3$, $SnB_{0.5}P_{0.5}Mg_{0.1}F_{0.06}O_{3.07}$, $SnB_{0.5}P_{0.5}Mg_{0.1}F_{0.14}O_{3.03}$, $SnPBa_{0.08}O_{3.58}$, $SnPK_{0.1}O_{3.55}$, $SnPK_{0.05}Mg_{0.05}O_{3.58}$, $SnPCs_{0.1}O_{3.55}$, $SnPBa_{0.08}F_{0.08}O_{3.54}$, $SnPK_{0.1}Mg_{0.1}F_{0.2}O_{3.55}$, $SnPK_{0.05}Mg_{0.05}F_{0.1}O_{3.53}$, $SnPCs_{0.1}Mg_{0.1}F_{0.2}O_{3.55}$, $SnPCs_{0.05}Mg_{0.05}F_{0.1}O_{3.5}$, $Sn_{1.1}Al_{0.4}B_{0.2}P_{0.6}Ba_{0.08}F_{0.08}O_{3.54}$, $Sn_{1.1}Al_{0.4}B_{0.2}P_{0.6}Li_{0.1}K_{0.1}Ba_{0.1}F_{0.1}O_{3.65}$, $Sn_{1.1}Al_{0.4}B_{0.4}P_{0.4}Ba_{0.08}O_{3.34}$, $Sn_{1.1}Al_{0.4}PCs_{0.05}O_{4.23}$, $Sn_{1.1}Al_{0.4}PK_{0.05}O_{4.23}$, $Sn_{1.2}Al_{0.5}B_{0.3}P_{0.4}Cs_{0.2}O_{3.5}$, $Sn_{1.2}Al_{0.4}B_{0.2}P_{0.06}Ba_{0.08}O_{3.68}$, $Sn_{1.2}Al_{0.4}B_{0.2}P_{0.6}Ba_{0.08}F_{0.08}O_{3.64}$, $Sn_{1.2}Al_{0.4}B_{0.2}P_{0.6}Mg_{0.04}Ba_{0.04}O_{3.68}$, $Sn_{1.2}Al_{0.4}B_{0.3}P_{0.5}Ba_{0.08}O_{3.58}$, $Sn_{1.3}Al_{0.3}B_{0.3}P_{0.4}Na_{0.2}O_{3.3}$, $Sn_{1.3}Al_{0.2}B_{0.4}P_{0.4}Ca_{0.2}O_{3.4}$, $Sn_{1.3}Al_{0.4}B_{0.4}P_{0.4}Ba_{0.2}O_{3.6}$, $Sn_{1.4}Al_{0.4}PK_{0.2}O_{4.6}$, $Sn_{1.4}Al_{0.2}Ba_{0.1}PK_{0.2}O_{4.45}$, $Sn_{1.4}Al_{0.2}Ba_{0.2}PK_{0.2}O_{4.6}$, $Sn_{1.4}Al_{0.4}Ba_{0.2}PK_{0.2}Ba_{0.1}F_{0.2}O_{4.9}$, $Sn_{1.4}Al_{0.4}PK_{0.3}O_{4.65}$, $Sn_{1.5}Al_{0.2}PK_{0.2}O_{4.4}$, $Sn_{1.5}Al_{0.4}PK_{0.1}O_{4.65}$, $Sn_{1.5}Al_{0.4}PCs_{0.05}O_{4.63}$, $Sn_{1.5}Al_{0.4}PCs_{0.05}Mg_{0.1}F_{0.2}O_{4.63}$, $SnSi_{0.5}Al_{0.1}B_{0.2}P_{0.1}Ca_{0.4}O_{3.1}$, $SnSi_{0.4}Al_{0.2}B_{0.4}O_{2.7}$, $SnSi_{0.5}Al_{0.2}B_{0.1}P_{0.1}Mg_{0.1}O_{2.8}$, $SnSi_{0.6}Al_{0.2}B_{0.2}O_{2.8}$, $SnSi_{0.5}Al_{0.3}B_{0.4}P_{0.2}O_{3.55}$, $SnSi_{0.5}Al_{0.3}B_{0.4}P_{0.5}O_{4.30}$, $SnSi_{0.6}Al_{0.1}B_{0.1 \ P0.3}O_{3.25}$, $SnSi_{0.6}Al_{0.1}B_{0.1}P_{0.1}Ba_{0.2}O_{2.95}$, $SnSi_{0.6}Al_{0.1}B_{0.1}P_{0.1}Ca_{0.2}O_{2.95}$, $SnSi_{0.6}Al_{0.4}B_{0.2}Mg_{0.1}O_{3.2}$, $SnSi_{0.6}Al_{0.1}B_{0.3}P_{0.1}O_{3.05}$, $SnSi_{0.6}Al_{0.2}Mg_{0.2}O_{2.7}$, $SnSi_{0.6}Al_{0.2}Ca_{0.2}O_{2.7}$, $SnSi_{0.6}Al_{0.2}P_{0.2}O_3$, $SnSi_{0.6}B_{0.2}P_{0.2}O_3$, $SnSi_{0.8}Al_{0.2}O_{2.9}$, $SnSi_{0.8}Al_{0.3}B_{0.2}P_{0.2}O_{3.85}$, $SnSi_{0.8}B_{0.2}O_{2.9}$, $SnSi_{0.8}Ba_{0.2}O_{2.8}$, $SnSi_{0.8}Mg_{0.2}O_{2.8}SnSi_{0.8}Ca_{0.2}O_{2.8}$, $SnSi_{0.8}P_{0.2}O_{3.1}$, $Sn_{0.9}Mn_{0.3}B_{0.4}P_{0.4}Ca_{0.1}Rb_{0.1}O_{2.95}$, $Sn_{0.9}Fe_{0.3}B_{0.4}P_{0.4}Ca_{0.1}Rb_{0.1}O_{2.95}$, $Sn_{0.8}Pb_{0.2}Ca_{0.1}P_{0.9}O_{3.35}$, $Sn_{0.3}Ge_{0.7}Ba_{0.1}P_{0.9}O_{3.35}$, $Sn_{0.9}Mn_{0.1}Mg_{0.1}P_{0.9}O_{3.35}$, $Sn_{0.2}Mn_{0.8}Mg_{0.1}P_{0.9}O_{3.35}$, $Sn_{0.7}Pb_{0.3}Ca_{0.1}P_{0.9}O_{3.35}$, $Sn_{0.2}Ge_{0.8}Ba_{0.1}P_{0.9}O_{3.35}$.

The chemical formulae of the above-described compounds, which are obtained by calcining, can be determined by inductively coupled plasma (ICP) emission spectroanalysis or, more conveniently, by calculation making use of the difference in powder weight between before and after the calcining.

Lithium ions are intercalated into the negative electrode material before and/or after assembly into a battery. Intercalation is carried out until the electrode potential approximates to the potential of lithium precipitation. For example, the amount intercalated is preferably 50 to 700 mol %, still preferably 100 to 600 mol %, based on the negative electrode material. The amount deintercalated is preferably as much as possible with reference to the amount intercalated. Intercalation of lithium ions is preferably performed by an electrochemical process, a chemical process or a thermal process. The electrochemical process or the chemical process is preferred. The electrochemical process is preferably carried out by electrochemically inserting lithium ions present in the positive electrode active material or directly inserting lithium ions from metallic lithium or a lithium alloy. The chemical process can be carried out by mixing or contacting the negative electrode material with metallic lithium or reacting the negative electrode material with an organolithium compound, e.g., butyl lithium.

Where the compound represented by formula (V) or (VI) mainly is used as a negative electrode material, the non-aqueous secondary battery of the invention has more excellent charge and discharge cycle characteristics, a high discharge potential, a high capacity, high safety, and excellent high-current characteristics. Particularly excellent effects can be obtained where an Sn compound in which Sn is present with divalency is used as a negative electrode material. The valency of Sn can be determined by chemical titration. For example, the analysis can be made in accordance with the method described in *Physics and Chemistry of Glasses*, Vol. 8, No. 4, p. 165 (1967). The valency of Sn can also be decided from the knight shift in the solid nuclear magnetic resonance (NMR) spectrum of Sn. For example, in broad-line NMR measurement, metallic Sn (zero valent Sn) shows a peak in an extremely low magnetic field and in the vicinity of 7000 ppm with reference to $Sn(CH_3)_4$, whereas the peak of SnO (divalent Sn) appears around 100 ppm, and that of $SnO_2$ (tetravalent Sn) appears around −600 ppm. Like this, the knight shift largely depends on the valency of the center metal, Sn, with the ligands being the same. The valency can thus be determined by the peak position obtained by $^{119}$Sn-NMR analysis.

The negative electrode material of the invention may contain various compounds, such as compounds of transition metal elements (e.g., Sc, Ti, V, Cr, Mn, Fe, Co, Ni, Cu, Zn, Y, Zr, Nb, Mo, Tc, Ru, Rh, Pd, Ag, Cd, lanthanide metals, Hf, Ta, W, Re, Os, Ir, Pt, Au, and Hg) and compounds of the group 17 elements (e.g., F and Cl). The negative electrode material can also contain various compounds as a dopant imparting electron conductivity (e.g., Sb, In or Nb compounds). The total amount of these compounds added is preferably 0 to 20 mol %.

The composite oxides represented by formulae (V) or (VI) can be synthesized by a calcining method or a solution method. The calcining method is conducted by sufficiently mixing an $M^1$ compound(s), an $M^2$ compound(s), and an $M^4$ compound(s) ($M^1$ and $M^2$, which may be the same or different, each represent Si, Ge, Sn, Pb, P, B, Al or Sb; and $M^4$ represents Li, Na, K, Rb, Cs, Mg, Ca, Sr and Ba) and calcining the mixture.

Examples of Sn compounds include SnO, $SnO_2$, $Sn_2O_3$, $Sn_3O_4$, $Sn_7O_{13}.H_2O$, $Sn_8O_{15}$, stannous hydroxide, stannic oxyhydroxide, stannous acid, stannous oxalate, stannous phosphate, orthostannic acid, metastannic acid, parastannic acid, stannous fluoride, stannic fluoride, stannous chloride, stannic chloride, stannous pyrophosphate, tin phosphate, stannous sulfide, and stannic sulfide.

Examples of Si compounds include $SiO_2$, SiO, organosilicon compounds (e.g., tetramethylsilane and tetraethylsilane), alkoxysilane compounds (e.g., tetramethoxysilane and tetraethoxysilane), and hydrosilane compounds (e.g., trichlorohydrosilane).

Examples of Ge compounds include $GeO_2$, GeO, and germanium alkoxides (e.g., germanium tetramethoxide and germanium tetraethoxide).

Examples of Pb compounds include $PbO_2PbO$, $Pb_2O_3$, $Pb_3O_4$, lead nitrate, lead carbonate, lead formate, lead acetate, lead tetraacetate, lead tartrate, lead diethoxide, and lead di(isopropoxide).

Examples of P compounds include phosphorus pentoxide, phosphorus oxychloride, phosphorous pentachloride, phosphorus trichloride, phosphorus tribromide, trimethyl phosphate, triethyl phosphate, tripropyl phosphate, stannous pyrophosphate, and boron phosphate.

Examples of B compounds include boron sesquioxide, boron trichloride, boron tribromide, boron carbide, boric acid, trimethyl borate, triethyl borate, tripropyl borate, tributyl borate, boron phosphide, and boron phosphate.

Examples of Al compounds include aluminum oxide (α-alumina or β-alumina), aluminum silicate, aluminum triisopropoxide, aluminum tellurite, aluminum chloride, aluminum borate, aluminum phosphide, aluminum phosphate, aluminum lactate, aluminum borate, aluminum sulfide, aluminum sulfate, and aluminum boride.

Examples of Sb compounds include diantimony trioxide and triphenylantimony.

Examples of Mg, Ca, Sr or Ba compounds include oxides, hydroxides, carbonates, phosphates, sulfates, nitrates, and aluminum compounds.

Calcination is carried out preferably at a rate of temperature rise of 4 to 2000° C./min, still preferably 6 to 2000° C./min, particularly preferably 10 to 2000° C./min; at a calcining temperature of 2500 to 1500° C., still preferably 3500 to 1500° C., particularly preferably 5000 to 1500° C.; for a period of 0.01 to 100 hours, still preferably 0.5 to 70 hours, particularly preferably 1 to 20 hours. After calcining, the temperature is dropped preferably at a rate of temperature drop of 2 to 107° C./min, still preferably 4 to 107° C./min, still more preferably 6 to 107° C./min, particularly preferably 10 to 107° C./min.

The term "rate of temperature rise" as used herein means an average rate of temperature rise from 50% of the calcining temperature (° C.) to 80% of the calcining temperature (° C.), and the term "rate of temperature drop" as used herein means an average rate of temperature drop from 80% of the calcining temperature (° C.) to 50% of the calcining temperature (° C.).

Cooling of the calcined product may be effected either within a calcining furnace or out of the furnace, for example, by pouring the product into water. Ultrarapid cooling methods described in *Ceramics Processing*, p. 217, Gihodo (1987), such as a gunning method, a Hammer-Anvil method, a slapping method, a gas atomizing method, a plasma spray method, a centrifugal quenching method, and a melt drag method, can also be used. Further, cooling may be conducted by a single roller method or a twin-roller method described in *New Glass Handbook*, p. 172, Maruzen (1991). Where the material melts during calcining, the calcined product may be taken out continuously while feeding the raw materials to the furnace. The melt is preferably stirred where the material melts during calcining. The calcining atmosphere preferably has an oxygen content of not more than 5% by volume. An inert gas atmosphere is still preferred. Examples of suitable inert gases include nitrogen, argon, helium, krypton, and xenon.

The compound represented by formula (V) or (VI) preferably has an average particle size of 0.1 to 60 μm, particularly 1.0 to 30 μm, especially 2.0 to 20 μu. Grinding of the calcined mass to a prescribed size is carried out by means of well-known grinding machines, such as a mortar, a ball mill, a sand mill, a vibration ball mill, a satellite ball mill, a planetary ball mill, and a spinning air flow type jet mill. If necessary, wet grinding using water or an organic solvent, such as methanol, may be conducted. The grinds are preferably classified to obtain a desired particle size either by dry or wet classification by means of a sieve, an air classifier, levigation, etc.

The positive electrode active material for use in the invention which is capable of intercalating and deintercalating lithium is preferably a lithium-containing transition metal oxide. The lithium-containing transition metal oxide is preferably synthesized by mixing a lithium compound and a compound containing at least one transition metal selected from the group consisting of Ti, V, Cr, Mn, Fe, Co, Ni, Mo, and W at a lithium compound/total transition metal compound molar ratio of 0.3 to 2.2. The lithium-containing transition metal oxide is still preferably synthesized by mixing a lithium compound and a compound of at least one transition metal selected from the group consisting of, Cr, Mn, Fe, Co, and Ni at a lithium compound/total transition metal compound molar ratio of 0.3 to 2.2.

Particularly preferred lithium-containing transition metal oxides are represented by formula $Li_xQO_y$, wherein Q is, for the most part, at least one transition metal essentially including at least one of Co, Mn, Ni, V or Fe; x is 0.2 to 1.2; and y is 1.4 to 3. Q can contain Al, Ga, In, Ge, Sn, Pb, Sb, Bi, Si, P, B, etc. in addition to the transition metal(s). The ratio of these additional elements is preferably 0 to 30 mol % based on the total transition metals.

Still preferred lithium-containing transition metal oxide positive electrode active materials which can be used in the present invention include $Li_xCoO_2$, $Li_xNiO_2$, $Li_xMnO_2$, $Li_xCo_aNi_{1-a}O_2$, $Li_xCo_bV_{1-b}O_z$, $Li_xCo_bFe_{1-b}O_2$, $Li_xMn_2O_4$, $Li_xMn_cCo_{2-c}O_4$, $Li_xMn_cNi_{2-c}O_4$, $Li_xMn_cV_{2-c}O_4$, and $Li_xMn_cFe_{2-c}O_4$ (wherein x=0.7 to 1.2; a=0.1 to 0.9; b=0.8 to 0.98; c=1.6 to 1.96; and z=2.01 to 2.3).

Particularly preferred lithium-containing metal oxide positive electrode active materials for use in the invention include $Li_xCoO_2$, $Li_xNiO_2$, $Li_xMnO_2$, $Li_xCo_aNi_{1-a}O_2$, $Li_xMn_2O_4$, and $Li_xCo_bV_{1-b}O_z$ (wherein x=0.7 to 1.2; a=0.1 to 0.9; b=0.9 to 0.98; and z=2.01 to 2.3).

The value x in the above formulae is the value before commencement of charging and discharging and varies with a charge and a discharge.

The electrically conducting agent which can be used in the electrode material mixture may be any electron-conducting material which undergoes no chemical change in an assembled battery. Examples of suitable conducting agents include natural graphite such as scaly graphite, flaky graphite, and earthy graphite; those obtained by calcining petroleum coke, coal coke, cellulose materials, sugars, mesophase pitch, etc., at high temperature; artificial graphite such as vapor-phase growth graphite; carbon black such as acetylene black, furnace black, Ketjen black, channel black, lamp black, and thermal black; asphalt pitch, coal tar, activated carbon, mesophase pitch, and polyacene; electrically conducting fibers such as metallic fibers; metal powders such as copper, nickel, aluminum and silver; conductive whiskers such as zinc oxide whisker and potassium titanate whisker; and conductive metal oxides such as titanium oxide; and mixtures of two or more thereof. Graphite and carbon black are preferred of them.

The electrically conducting agent is preferably used in an amount of from 6 to 50% by weight, still preferably from 6 to 30% by weight, based on the negative electrode material or positive electrode material. In particular, carbon black or graphite is preferably used in an amount of from 6 to 20% by weight.

The binder, which is used to hold the electrode material mixture, includes polysaccharides, thermoplastic resins, polymers having rubbery elasticity, and mixtures thereof. Examples of suitable binders include water-soluble polymers, such as starch, carboxymethyl cellulose, cellulose, diacetyl cellulose, methyl cellulose, hydroxyethyl cellulose, hydroxypropyl cellulose, sodium alginate, polyacrylic acid, sodium polyacrylate, polyvinyl phenol, polyvinyl methyl ether, polyvinyl alcohol, polyvinyl pyrrolidone, polyacrylamide, polyhydroxy(meth)acrylates, and styrene-maleic acid copolymers; emulsions (latices) or suspensions of polyvinyl chloride, tetrafluoroethylene, polyvinylidene fluoride, tetrafluoroethylene-hexafluoropropylene copolymers, vinylidene fluoride-tetrafluoroethylene-hexafluoropropylene copolymers, polyethylene, polypropylene, ethylene-propylene-diene terpolymers (EPDM), sulfonated EPDM, polyvinyl acetal resins, (meth)acrylate copolymers comprising a (meth)acrylic ester unit (e.g., methyl methacrylate or 2-ethylhexyl acrylate), (meth)acrylate-acrylonitrile copolymers, polyvinyl ester copolymers comprising a vinyl ester unit (e.g., vinyl acetate), styrene-butadiene copolymers, acrylonitrile-butadiene copolymers, polybutadiene, neoprene rubber, fluororubbers, polyethylene oxide, polyester polyurethane resins, polyether polyurethane resins, polycarbonate polyurethane resins, polyester resins, phenolic resins, and epoxy resins. Among these, latex of acrylate polymers, carboxymethyl cellulose, polytetrafluoroethylene, and polyvinylidene fluoride are preferred. These binders can be used either individually or as a mixture thereof.

While not limiting, the binder is preferably used in a proportion of 1 to 30% by weight, particularly 2 to 10% by weight, based on the electrode material mixture. If used in too small a proportion, the binder has an insufficient cohesive force or insufficient capability of holding the electrode material mixture, and the cycle characteristics become poor. Use of too much binder increases the volume of the electrode, resulting in reduction of capacity per unit volume or weight of the electrode. Further, the electrical conductivity reduces to diminish the capacity.

The negative or positive electrode material mixture is preferably prepared in an aqueous system. In the preparation, the active material and an electrically conducting agent are first mixed up, and the mixture is kneaded together with a binder (a suspension or emulsion (latex) of a powdered resin) and water, followed by dispersing by means of a stirring mixer or a dispersing machine, such as a mixer, a homogenizer, a dissolver, a planetary mixer, a paint shaker, and a sand mill.

The pasty electrode material mixture thus prepared is applied to a current collector by various coating techniques, such as reverse roll coating, direct roll coating, blade coating, knife coating, extrusion coating, curtain coating, gravure coating, bar coating, dip coating, and squeeze coating. Blade coating, knife coating or extrusion coating is preferred. Coating is preferably carried out at a line speed of 0.1 to 100 m/min. Proper selection of a coating technique according to the physical properties and drying properties of the pasty electrode material mixture will assure satisfactory surface conditions of the resulting coated layer. The thickness, length and width of the coated layer are decided according to the battery size. The thickness of the coated layer after drying and compression is typically from 1 to 2000 $\mu$m, per both sides.

The coating layer (in the form of a pellet or a sheet) is then dried or dehydrated by hot air drying, vacuum drying, infrared drying, far infrared drying, electron beam drying, low humidity air drying or a combination thereof. The drying temperature preferably ranges from 800 to 350° C., particularly from 100° to 250° C. For securing charge and discharge cycle characteristics, the water content of the whole battery is preferably 2000 ppm or less, and that of the positive or negative electrode material mixture or the electrolytic solution is preferably 500 ppm or less.

Compression of the coated layer can be carried out by a generally employed pressing means, preferably by mold pressing or calendering. While not limiting, the pressing pressure is preferably 10 kg/cm$^2$ to 3 t/cm$^2$. The roll-pressing speed in calendering is preferably 0.1 to 50 m/min. The pressing temperature is preferably from room temperature to 200° C.

Supports for the positive and negative electrodes, i.e., current collectors used in the present invention can be foil, expanded metal, punched metal or net. Examples of suitable materials of a current collector for the positive electrode include aluminum, stainless steel, nickel, titanium, and alloys thereof. Aluminum foil is preferred for the positive electrode. Examples of suitable materials of a current collector for the negative electrode include copper, stainless steel, nickel, titanium, and alloys thereof. Copper foil is preferred for the negative electrode.

The separator which can be used in the present invention is made of an insulating material (or film) exhibiting high ion permeability and prescribed mechanical strength. Suitable materials of the separator include olefin polymers, fluororesins, cellulosic polymers, polyimide, nylon, glass fiber, and alumina fiber. Polypropylene, polyethylene, a mixture of polypropylene and polyethylene, a mixture of polypropylene and Teflon, and a mixture of polyethylene and Teflon are preferred. Suitable forms of the separator include nonwoven fabric, woven fabric, and porous film, with porous film being preferred. Porous film having a pore size of 0.01 to 1 µm and a thickness of 5 to 50 µm is particularly preferred.

Examples of the shape of the battery includes a cylinder, a prism, a button, a coin, a sheet, and the like. The pellet or sheet or a roll of sheet electrodes having a separator therebetween is put in a battery case, and the electrodes and the case are electrically connected. An electrolytic solution is poured therein, and the case is sealed to make a battery. An explosion-proof valve can be used as a sealing plate. For further securing safety, a PTC element is preferably used.

A closed-end battery case (i.e., can) which can be used in the present invention is made of nickel-plated steel, stainless steel (e.g., SUS304, SUS304L, SUS304N, SUS316, SUS316L, SUS430, SUS444, etc.), nickel-plated stainless steel (the above examples apply), aluminum or aluminum alloys, nickel, titanium or copper. Examples of the shape of the closed-end case includes cylinders with a section of a true circle or an ellipse, prisms with a section of a square or a rectangle. Where a battery case serves as a negative electrode terminal, it is preferably made of a stainless steel plate or a nickel-plated steel plate. Where a battery case serves as a positive electrode terminal, it is preferably made of a stainless steel plate, an aluminum plate or an aluminum alloy plate.

Electrodes of sheet form are rolled or folded and put into the case. An electrolytic solution is poured therein, and the case is sealed with a sealing plate. An explosion-proof valve can be used as a sealing plate. In addition to the explosion-proof valve, the battery can have other various safety elements, such as a temperature fuse, a bimetal, and a PTC element. As a means for preventing over-current. As a measure against an increase of internal pressure of a battery case, a cut (i.e., a nick) may be made in such members as a battery case, a gasket, or a sealing plate. A charger can be provided with a circuit for preventing overcharge or overdischarge.

The electrolytic solution is poured into a battery case either all at once or in two or more divided portions. In the latter mode of addition, which is preferred to the former, the portions may be the same or different in composition. For example, addition of a nonaqueous solvent (A) or a solution of a lithium salt in the solvent (A) can be followed by addition of a nonaqueous solvent (B) having a higher viscosity than the solvent (A) or a solution of a lithium salt in the solvent (B). The time required for the addition can be shortened by evacuating the battery case (preferably to a degree of vacuum of 1 to 500 torr, particularly 10 to 400 torr) or applying centrifugal force or ultrasonic waves to the battery case.

A battery case and a lead plate which can be used in the present invention can be made of an electrically conductive metal, such as iron, nickel, titanium, chromium, molybdenum, copper or aluminum, or an alloy thereof. The cap, case, electrode sheets, and lead plate are welded by a well-known technique, such as direct current or alternating current electric welding, laser welding or ultrasonic welding. Conventionally known compounds or mixtures, such as asphalt, can be used as a sealant for the battery.

A gasket which can be used in the present invention is made of an olefin polymer, a fluororesin, a cellulosic polymer, polyimide, polyamide, etc. An olefin polymer, particularly propylene polymer, is preferred for its resistance to organic solvents and low permeability to moisture. A propylene-ethylene block copolymer is particularly preferred.

If desired, the battery of the invention is covered with a sheathing material, such as a shrinkable tube, an adhesive tape, a metallic film, paper, cloth, paint, and a plastic case. At least part of the sheath may be made of a thermochromic material so that the thermal history during use could be seen.

If desired, a plurality of the batteries can be connected in series and/or parallel to make a pack of batteries. The pack of batteries can have safety elements, such as a PTC element, a temperature fuse, a fuse, and/or a current breaking element, and a safety circuit (a circuit having a function of monitoring the voltage, temperature, current, etc. of the individual batteries and/or the set of the batteries, if desired, combined with a function for shutting the current flow). The battery pack can also have external terminals in addition to the positive and negative terminals for the battery set, such as positive and negative terminals for the individual batteries, thermal sensor terminals for the battery set and the individual batteries, and a current sensor terminal for the battery set. The battery pack may contain a voltage converting circuit (e.g., a DC-DC converter). The individual batteries can be connected by welding lead plates or removably connected by means of sockets. The battery pack may have a function of displaying the residual capacity, necessity of a charge, the number of times of use, and the like.

The nonaqueous secondary battery of the present invention is useful in a wide variety of equipment. It is particularly suitable to video cameras, portable video tape recorders with a monitor, movie cameras with a monitor, compact cameras, single-lens reflex cameras, film units with a lens, notebook personal computers, notebook word processors, pocket (palm-top) personal computers, mobile phones, wireless phone extensions, electrical shavers, electrical tools, motor mixers, automobiles, and so on.

The present invention will now be illustrated in greater detail with Examples, but it should be understood that the present invention is not limited thereto. Unless otherwise noted, all the parts and percents are by weight.

EXAMPLE 1 AND COMPARATIVE EXAMPLE 1

Preparation of Positive Electrode Material Mixture Paste:

$LiCoO_2$ (200 g) was mixed as a positive electrode active material with 10 g of acetylene black in a homogenizer. Subsequently, 8 g of an aqueous dispersion (solid contents: 50%) of a 2-ethylhexyl acrylate/acrylic acid/acrylonitrile copolymer and 60 g of a 2% aqueous solution of carboxymethyl cellulose were added thereto as a binder and mixed. The mixture was further kneaded together with 50 g of water in a homogenizer to prepare a paste of a positive electrode material mixture.

$LiCoO_2$ used here as a positive electrode active material was prepared by putting a 3/2 (by mole) mixture of lithium carbonate and tricobalt tetroxide in an alumina crucible, calcining the mixture at 750° C. (rate of temperature rise: 2° C./min) for 4 hours in air, further elevating the temperature up to 900° C. at a rate of 2° C./min, at which the mixture was calcined for 8 hours, followed by grinding. A dispersion containing 50 g of the resulting active material particles (as washed; median size: 5 µm) in 100 ml of water had an electric conductivity of 0.6 mS/m and a pH of 10.1. The specific surface area of the particles was 0.42 $m^2/g$ as measured by a nitrogen adsorption method.

Preparation of Negative Electrode Material Mixture Paste:

$SnGe_{0.5}B_{0.5}P_{0.58}Mg_{0.1}K_{0.1}O_{3.35}$ (200 g) as a negative electrode material was mixed with 30 g of artificial graphite as a conducting agent in a homogenizer. The mixture was kneaded with 50 g of a 2% aqueous solution of carboxymethyl cellulose and 10 g of polyvinylidene fluoride, and further kneaded with 30 g of water to prepare a paste for a negative electrode material mixture.

The negative electrode material used here was prepared by dry blending 6.7 g of tin monoxide, 10.3 g of tin pyrophosphate, 1.7 g of diboron trioxide, 0.7 g of potassium carbonate, 0.4 g of magnesium oxide, and 1.0 g of germanium dioxide, putting the blend in an alumina crucible, heating the blend to 1000° C. at a rate of temperature rise of 15° C./min in an argon atmosphere, calcining the blend at 1100° C. for 12 hours, dropping the temperature to room temperature at a rate of 10° C./min, and grinding the calcined product taken out of the calcining kiln in a jet mill. The resulting compound had an average particle size of 4.5 $\mu$m and showed a broad band having a peak at around 280 (in terms of 2Θ) in X-ray diffractometry using CuKα rays, with no crystalline diffraction lines between 400 and 700 (in terms of 2Θ).

Preparation of Positive and Negative Electrode Sheets:

The positive electrode material mixture paste was applied to both sides of a 30 $\mu$m thick aluminum foil current collector in a coating weight of 400 g/m² per both sides by means of a blade coater, dried, and compression molded by a roller press to obtain a sheet having a thickness of 280 $\mu$m per both sides. The sheet was cut into a band of prescribed size, and thoroughly dehydrated by heating with a far infrared heater in a dry box (dry air having a dew point of −50° C. or lower) to prepare a positive electrode sheet.

In the same manner as described above, the negative electrode material mixture paste was applied to both sides of a 20 $\mu$m thick copper foil current collector in a coating weight of 70 $\mu$m² per both sides, dried, and compressed to obtain a negative electrode sheet having a thickness of 90 $\mu$m per both sides.

Preparation of Electrolytic Solution:

In an argon atmosphere 65.3 g of diethyl carbonate was put in a 200 ml-volume narrow-necked polypropylene container, and 22.2 g of ethylene carbonate was dissolved therein in small portions taking care that the liquid temperature did not exceed 30° C. Then 0.4 g of $LiBF_4$ and 12.1 g of $LiPF_6$ were slowly dissolved therein in this order taking care that the liquid temperature did not exceed 30° C. The resulting electrolytic solution was a colorless transparent liquid having a specific gravity of 1.135, a water content of 18 ppm as measured with a Karl Fischer's titration apparatus (Model MKC-210 manufactured by Kyoto Denshi K.K.), and a free acid content of 24 ppm as measured by neutralization titration using Bromothymol Blue as an neutralization indicator and a 0.1N NaOH aqueous solution. The triarylamine compound (1) [i.e., the additive (1)] and/or organoboron compound (2) [i.e., the additive (2)] shown in Table 1 below were added to the electrolytic solution to the indicated respective concentrations to prepare electrolytic solutions 1 to 35.

TABLE 1

| Electrolytic Solution | Additive (1) Kind | Additive (1) Concn. (mol/l) | Additive (2) Kind | Additive (2) Concn. (mol/l) |
|---|---|---|---|---|
| 1 | A-10 | 0.005 | I-1 | 0.005 |
| 2 | A-10 | 0.010 | I-1 | 0.010 |
| 3 | A-10 | 0.015 | I-1 | 0.015 |
| 4 | A-10 | 0.01 | H-1 | 0.01 |
| 5 | A-10 | 0.01 | J-11 | 0.01 |
| 6 | A-10 | 0.01 | X-1 | 0.01 |
| 7 | A-10 | 0.01 | X-2 | 0.01 |
| 8 | A-10 | 0.01 | X-3 | 0.01 |
| 9 | A-10 | 0.01 | Y-1 | 0.01 |
| 10 | A-10 | 0.01 | Z-8 | 0.01 |
| 11 | A-1 | 0.01 | I-1 | 0.01 |
| 12 | A-11 | 0.01 | I-1 | 0.01 |
| 13 | A-19 | 0.01 | I-1 | 0.01 |
| 14 | A-20 | 0.01 | I-1 | 0.01 |
| 15 | A-22 | 0.01 | I-1 | 0.01 |
| 16 | E-10 | 0.005 | I-1 | 0.005 |
| 17 | E-10 | 0.01 | I-1 | 0.01 |
| 18 | E-10 | 0.015 | I-1 | 0.015 |
| 19 | E-10 | 0.01 | H-1 | 0.01 |
| 20 | E-10 | 0.01 | J-11 | 0.01 |
| 21 | E-10 | 0.01 | X-1 | 0.01 |
| 22 | E-10 | 0.01 | X-2 | 0.01 |
| 23 | E-10 | 0.01 | X-3 | 0.01 |
| 24 | E-10 | 0.01 | Y-1 | 0.01 |
| 25 | E-10 | 0.01 | Z-8 | 0.01 |
| 26 | E-1 | 0.01 | I-1 | 0.01 |
| 27 | E-11 | 0.01 | I-1 | 0.01 |
| 28 | E-19 | 0.01 | I-1 | 0.01 |
| 29 | E-20 | 0.01 | I-1 | 0.01 |
| 30 | E-22 | 0.01 | I-1 | 0.01 |
| 31 | — | — | — | — |
| 32 | A-10 | 0.01 | — | — |
| 33 | — | — | I-1 | 0.01 |
| 34 | A-10 | 0.0001 | I-1 | 0.0001 |
| 35 | A-10 | 0.5 | I-1 | 0.5 |

Preparation of Cylinderical Battery:

Cylinder batteries having the structure shown in FIG. 1 were prepared as follows. The positive electrode sheet, a finely porous polyethylene film separator, the negative electrode sheet, and the separator were laminated in the order described and rolled up into a cylinder. The roll (i.e., electrode group rolled up) (2) was put in a closed-end battery case (1) made of a nickel-plated iron plate which also served as a negative electrode terminal. The electrolytic solution shown in Table 1 was poured into the case. A cap (i.e., lid) (6) having a positive electrode terminal was cramped to the open top via a gasket (5) to prepare a cylindrical battery (designated battery 101 to 135).

EXAMPLE 2 AND COMPARATIVE EXAMPLE 2

Cylinderical batteries 201 to 235 were prepared in the same manner as in Example 1, except for replacing the composite oxide (based) negative electrode active material with graphite powder as a carbonaceous active material.

Evaluation:

Each of the batteries prepared in Examples 1 and 2 and Comparative Examples 1 and 2 was charged and discharged repeatedly under conditions of 5 MA/cm² in current density, 4.1 V in final charge voltage, and 2.6 V in final discharge voltage, to measure a discharge capacity (Wh) and a cycle life (i.e., cycle characteristics). The relative capacity of each battery was calculated taking the capacity of battery 131 as a standard. The ratio of the capacity in the 300th charge/discharge cycle to that of the first one was obtained. The results are shown in Tables 2 and 3.

TABLE 2

| Battery No. | Electrolytic Solution No. | Relative Capacity | Cycle Characteristics |
|---|---|---|---|
| 101 | 1 | 1.00 | 0.80 |
| 102 | 2 | 1.00 | 0.83 |
| 103 | 3 | 0.99 | 0.82 |
| 104 | 4 | 1.00 | 0.81 |
| 105 | 5 | 1.00 | 0.81 |
| 106 | 6 | 1.00 | 0.81 |
| 107 | 7 | 1.00 | 0.83 |
| 108 | 8 | 1.00 | 0.82 |
| 109 | 9 | 1.00 | 0.82 |
| 110 | 10 | 1.00 | 0.83 |
| 111 | 11 | 1.00 | 0.80 |
| 112 | 12 | 1.00 | 0.80 |
| 113 | 13 | 1.00 | 0.80 |
| 114 | 14 | 1.00 | 0.80 |
| 115 | 15 | 0.99 | 0.81 |
| 116 | 16 | 1.00 | 0.80 |
| 117 | 17 | 1.00 | 0.83 |
| 118 | 18 | 1.00 | 0.82 |
| 119 | 19 | 1.00 | 0.81 |
| 120 | 20 | 1.00 | 0.81 |
| 121 | 21 | 1.00 | 0.81 |
| 122 | 22 | 1.00 | 0.83 |
| 123 | 23 | 1.00 | 0.82 |
| 124 | 24 | 1.00 | 0.82 |
| 125 | 25 | 1.00 | 0.83 |
| 126 | 26 | 1.00 | 0.80 |
| 127 | 27 | 1.00 | 0.80 |
| 128 | 28 | 1.00 | 0.80 |
| 129 | 29 | 1.00 | 0.80 |
| 130 | 30 | 1.00 | 0.81 |
| 131 | 31 | 1.00 | 0.60 |
| 132 | 32 | 1.01 | 0.75 |
| 133 | 33 | 0.99 | 0.75 |
| 134 | 34 | 1.00 | 0.65 |
| 135 | 35 | 0.78 | 0.60 |

TABLE 3

| Battery No. | Electrolytic Solution No. | Relative Capacity | Cycle Characteristics |
|---|---|---|---|
| 201 | 1 | 0.80 | 0.78 |
| 202 | 2 | 0.80 | 0.81 |
| 203 | 3 | 0.79 | 0.80 |
| 204 | 4 | 0.80 | 0.79 |
| 205 | 5 | 0.80 | 0.79 |
| 206 | 6 | 0.80 | 0.79 |
| 207 | 7 | 0.80 | 0.81 |
| 208 | 8 | 0.80 | 0.80 |
| 209 | 9 | 0.80 | 0.80 |
| 210 | 10 | 0.80 | 0.81 |
| 211 | 11 | 0.80 | 0.78 |
| 212 | 12 | 0.80 | 0.78 |
| 213 | 13 | 0.80 | 0.78 |
| 214 | 14 | 0.80 | 0.78 |
| 215 | 15 | 0.79 | 0.79 |
| 216 | 16 | 0.80 | 0.78 |
| 217 | 17 | 0.80 | 0.81 |
| 218 | 18 | 0.80 | 0.80 |
| 219 | 19 | 0.80 | 0.79 |
| 220 | 20 | 0.80 | 0.79 |
| 221 | 21 | 0.80 | 0.79 |
| 222 | 22 | 0.80 | 0.81 |
| 223 | 23 | 0.80 | 0.80 |
| 224 | 24 | 0.80 | 0.80 |
| 225 | 25 | 0.80 | 0.81 |
| 226 | 26 | 0.80 | 0.78 |
| 227 | 27 | 0.80 | 0.78 |
| 228 | 28 | 0.80 | 0.78 |
| 229 | 29 | 0.80 | 0.78 |
| 230 | 30 | 0.80 | 0.79 |
| 231 | 31 | 0.81 | 0.65 |
| 232 | 32 | 0.80 | 0.73 |
| 233 | 33 | 0.80 | 0.73 |
| 234 | 34 | 0.80 | 0.63 |
| 235 | 35 | 0.65 | 0.58 |

EXAMPLE 3

Batteries were prepared in the same manner as in Example 1, except the additives were not added to the electrolytic solution but to the positive electrode active material. When tested in the same manner as in Examples 1 and 2, the batteries showed equal results.

EXAMPLE 4

Batteries were prepared in the same manner as in Examples 1 to 3, except that strips of lithium foil totally weighing 120 mg per gram of the negative electrode material were adhered to the negative electrode sheet and electrically connected and that the coating weight of the positive electrode active material mixture was changed to 240 g/m$^2$ per both sides. When tested in the same manner as in Example 1, the batteries showed equal results.

As is apparent from the above results, the additive compounds used in the present invention bring about improved cycle characteristics when applied either to an oxide or a carbonaceous material as a negative electrode material. The batteries of the present invention in which an oxide is used as a negative electrode active material have a higher capacity than those in which a carbonaceous negative electrode material is used.

It is also seen that the additive compounds are not so effective when added to the electrolytic solution in a total concentration of less than 0.001 mol/l and, on the other hand, impair their effect when added in a total concentration of more than 1.0 mol/l.

Thus, in the present invention, the nonaqueous secondary battery having an excellent charge and discharge characteristics and less deterioration of discharge capacity in the charge and discharge repeated can be obtained by using the components of the present invention in the battery.

While the invention has been described in detail and with reference to specific examples thereof, it will be apparent to one skilled in the art that various changes and modifications can be made therein without departing from the spirit and scope thereof.

What is claimed is:

1. A nonaqueous secondary battery comprising a positive electrode and a negative electrode both containing a material capable of reversibly intercalating and deintercalating lithium, a nonaqueous electrolytic solution containing a lithium salt, and a separator, wherein said battery contains at least one triarylamine compound and at least one organoboron compound.

2. The nonaqueous secondary battery as in claim 1, wherein said triarylamine compound is at least one compound selected from the group consisting of a compound represented by formula (I):

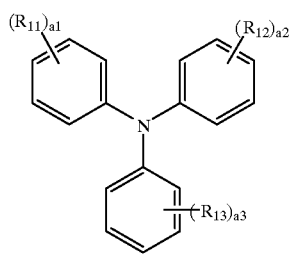

(I)

wherein $R_{11}$, $R_{12}$, and $R_{13}$, which may be the same or different, each represent a hydrogen atom, an alkyl group, a cycloalkyl group, an alkoxy group, an alkenyl group, an alkynyl group, an aralkyl group, an aryl group, a halogen atom, a cyano group, a nitro group, a hydroxyl group, a formyl group, an aryloxy group, an alkylthio group, an arylthio group, an acyloxy group, a sulfonyloxy group, an amino group, an alkylamino group, an arylamino group, a carbonamido group, a sulfonamido group, an oxycarbonylamino group, an oxysulfonylamino group, a ureido group, an acyl group, an oxycarbonyl group, a carbamoyl group, a sulfonyl group, a sulfinyl group, an oxysulfinyl group, a sulfamoyl group, a carboxylic acid group or a salt thereof, a sulfonic acid group or a salt thereof, a phosphoric acid group or a salt thereof, or a heterocyclic group; and a1, a2, and a3 each represent 0 or an integer of 1 to 5; and a compound represented by formula (II):

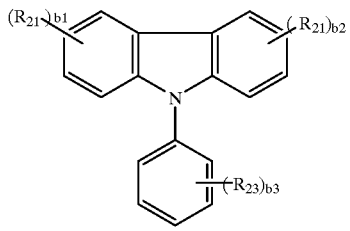

(II)

wherein $R_{21}$, $R_{22}$, and $R_{23}$ have the same meaning as $R_{11}$, $R_{12}$ and $R_{13}$ in formula (I); b1 and b2 each represent 0 or an integer of 1 to 4; and b3 represents 0 or an integer of 1 to 5.

3. The nonaqueous secondary battery as in claim 1, wherein said organoboron compound is at least one compound selected from the group consisting of a compound represented by formula (III):

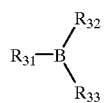

(III)

wherein $R_{31}$, $R_{32}$, and $R_{33}$, which may be the same or different, each represent an alkyl group, a cycloalkyl group, an alkoxy group, an aralkyl group, an aryl group, an aryloxy group, an alkylthio group, an arylthio group, an acyloxy group, a sulfonyloxy group, an acyl group, or an oxycarbonyl group; and a compound represented by formula (IV):

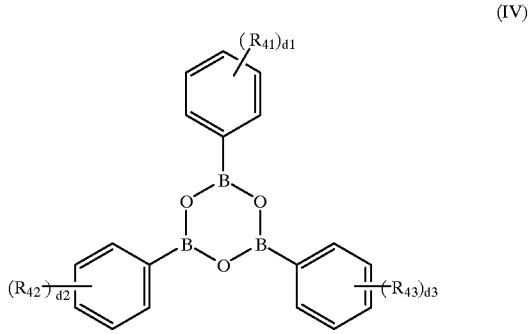

(IV)

wherein $R_{41}$, $R_{42}$, and $R_{43}$ have the same meaning as $R_{11}$, $R_{12}$ and $R_{13}$ in formula (I); and d1, d2, and d3 each represent 0 or an integer of 1 to 5.

4. The nonaqueous secondary battery as in claim 1, wherein said triarylamine compound and said organoboron compound are contained in the nonaqueous electrolytic solution.

5. The nonaqueous secondary battery as in claim 4, wherein said triarylamine compound and said organoboron compound are contained in a total concentration of 0.001 to 0.1 mol per liter of the nonaqueous electrolytic solution.

6. The nonaqueous secondary battery as in claim 1, wherein said negative electrode comprises a negative electrode material mainly comprising a predominantly amorphous chalcogenide and/or a predominantly amorphous oxide each containing at least one element selected from the groups 1, 2, 13, 14, and 15 of the Periodic Table.

7. The nonaqueous secondary battery as in claim 6, wherein said chalcogenide or oxide is represented by formula (V):

$$M^1 M^2_p M^4_q M^6 \quad (V)$$

wherein $M^1$ and $M^2$, which are different from each other, each represent at least one element selected from Si, Ge, Sn, Pb, P, B, Al, and Sb; $M^4$ represents at least one element selected from Li, Na, K, Rb, Cs, Mg, Ca, Sr, and Ba, $M^6$ represents at least one element selected from O, S, and Te; p and q each represent a number of from 0.001 to 10; and r represents a number of from 1.00 to 50.

* * * * *